United States Patent
Burnett

(10) Patent No.: US 9,928,475 B2
(45) Date of Patent: Mar. 27, 2018

(54) SHIPPER AND CARRIER INTERACTION OPTIMIZATION PLATFORM

(71) Applicant: Rick Burnett, San Diego, CA (US)

(72) Inventor: Rick Burnett, San Diego, CA (US)

( * ) Notice: Subject to any disclaimer, the term of this patent is extended or adjusted under 35 U.S.C. 154(b) by 0 days.

(21) Appl. No.: 15/078,965

(22) Filed: Mar. 23, 2016

(65) Prior Publication Data

US 2016/0203440 A1    Jul. 14, 2016

Related U.S. Application Data

(63) Continuation of application No. 14/794,619, filed on Jul. 8, 2015.

(Continued)

(51) Int. Cl.
 *G06Q 10/08* (2012.01)
 *G06F 3/0484* (2013.01)
(Continued)

(52) U.S. Cl.
 CPC ......... *G06Q 10/083* (2013.01); *G06F 3/0482* (2013.01); *G06F 3/04842* (2013.01);
(Continued)

(58) Field of Classification Search
 CPC .................. G06Q 10/0834; G06Q 10/083
 See application file for complete search history.

(56) References Cited

U.S. PATENT DOCUMENTS 7,353,181 B2    4/2008 Nel
7,385,529 B2    6/2008 Hersh et al.
(Continued)

FOREIGN PATENT DOCUMENTS

CN    101930580 A    12/2010
EP    1181655 A2    2/2002
(Continued)

OTHER PUBLICATIONS 10-4.com. (2015) Web. Mar. 23, 2016. <https://www.10-4.com/public/>.

(Continued)

*Primary Examiner* — Eric T Wong
(74) *Attorney, Agent, or Firm* — Mintz, Levin, Cohn, Ferris, Glovsky and Popeo, P.C.

(57) ABSTRACT

A shipper and carrier interaction optimization platform can include an internet based web page, application for a handheld device, a dedicated device with a graphical user interface, or any combination thereof for one or more shipper to enter shipment requirements and/or bids for use of a carrier's equipment. One or more carriers can enter equipment specifications, such as equipment type, availability, and minimum payment amount accepted, as well as bids for employment to ship goods via the shipper and carrier interaction optimization platform. The platform can automate matching shippers and carriers for each shipment, provide information regarding shipment status, and help carriers to maximize the amount of time their vehicles carry cargo. Systems may include a shipper interface, a carrier interface, one or more handheld devices running the interaction optimization platform, and positioning software and/or hardware to indicate the location of the one or more handheld devices used by shipment carriers.

18 Claims, 32 Drawing Sheets

Related U.S. Application Data

(60) Provisional application No. 62/022,165, filed on Jul. 8, 2014.

(51) Int. Cl.
  *G06Q 10/06* (2012.01)
  *G06Q 40/08* (2012.01)
  *G06F 3/0482* (2013.01)
  *H04W 4/02* (2018.01)

(52) U.S. Cl.
  CPC . *G06F 3/04847* (2013.01); *G06Q 10/063118* (2013.01); *G06Q 10/0832* (2013.01); *G06Q 10/0834* (2013.01); *G06Q 10/0835* (2013.01); *G06Q 40/08* (2013.01); *H04W 4/02* (2013.01)

(56) References Cited

U.S. PATENT DOCUMENTS

| | | | |
|---|---|---|---|
| 7,949,612 | B2 | 5/2011 | Davis, III |
| 8,219,312 | B2 | 7/2012 | Davidson et al. |
| 2002/0087371 | A1* | 7/2002 | Abendroth ............. G06Q 10/02 705/37 |
| 2003/0036935 | A1 | 2/2003 | Nel |
| 2003/0084125 | A1 | 5/2003 | Nagda et al. |
| 2004/0230601 | A1 | 11/2004 | Joao et al. |
| 2005/0091100 | A1 | 4/2005 | Riggs et al. |
| 2005/0209913 | A1 | 9/2005 | Wied et al. |
| 2005/0278063 | A1 | 12/2005 | Hersh et al. |
| 2006/0109964 | A1 | 5/2006 | Skelton |
| 2008/0281719 | A1* | 11/2008 | Hall ....................... G06Q 10/08 705/26.4 |
| 2012/0246039 | A1* | 9/2012 | Fain ....................... G06Q 10/08 705/32 |
| 2012/0268235 | A1 | 10/2012 | Farhan et al. |
| 2013/0097095 | A1* | 4/2013 | Rumig .................. G06Q 50/28 705/334 |
| 2013/0117142 | A1* | 5/2013 | Thompson ......... G06Q 10/0834 705/26.3 |
| 2013/0246298 | A1 | 9/2013 | Higham et al. |
| 2014/0143169 | A1 | 5/2014 | Lozito |
| 2014/0278635 | A1 | 9/2014 | Fulton et al. |
| 2015/0006428 | A1* | 1/2015 | Miller ................ G06Q 10/0835 705/336 |
| 2015/0134557 | A1 | 5/2015 | Cova et al. |
| 2015/0211882 | A1 | 7/2015 | Gumpert et al. |
| 2016/0012391 | A1 | 1/2016 | Burnett |
| 2016/0203437 | A1 | 7/2016 | Burnett |
| 2016/0203439 | A1 | 7/2016 | Burnett |
| 2016/0224935 | A1 | 8/2016 | Burnett |

FOREIGN PATENT DOCUMENTS

| | | |
|---|---|---|
| EP | 1354285 A2 | 10/2003 |
| WO | WO-02/054316 A2 | 7/2002 |
| WO | WO-2011/140130 A2 | 11/2011 |

OTHER PUBLICATIONS

"Datatrac for Drivers." *AppsZoom*. Jun. 27, 2014. Web. Apr. 29, 2016. <http://www.appszoom.com/android_applications/business/datatrac-for-drivers_cgqav.html>.

"Sylectus Mobile App." *Work Truck Magazine Online*. Feb. 6, 2014. Web. Apr. 29, 2016. <http://www.worktruckonline.com/channel/gps-telematics/product/detail/2014/02/sylectus-mobile-app.aspx>.

Dills, Todd. "New Shipper-carrier Connection Tool." *Overdrive Online*. Jan. 23, 2014. Web. Apr. 29, 2016. <http://www.overdriveonline.com/new-shipper-carrier-connection-tool/#>.

* cited by examiner

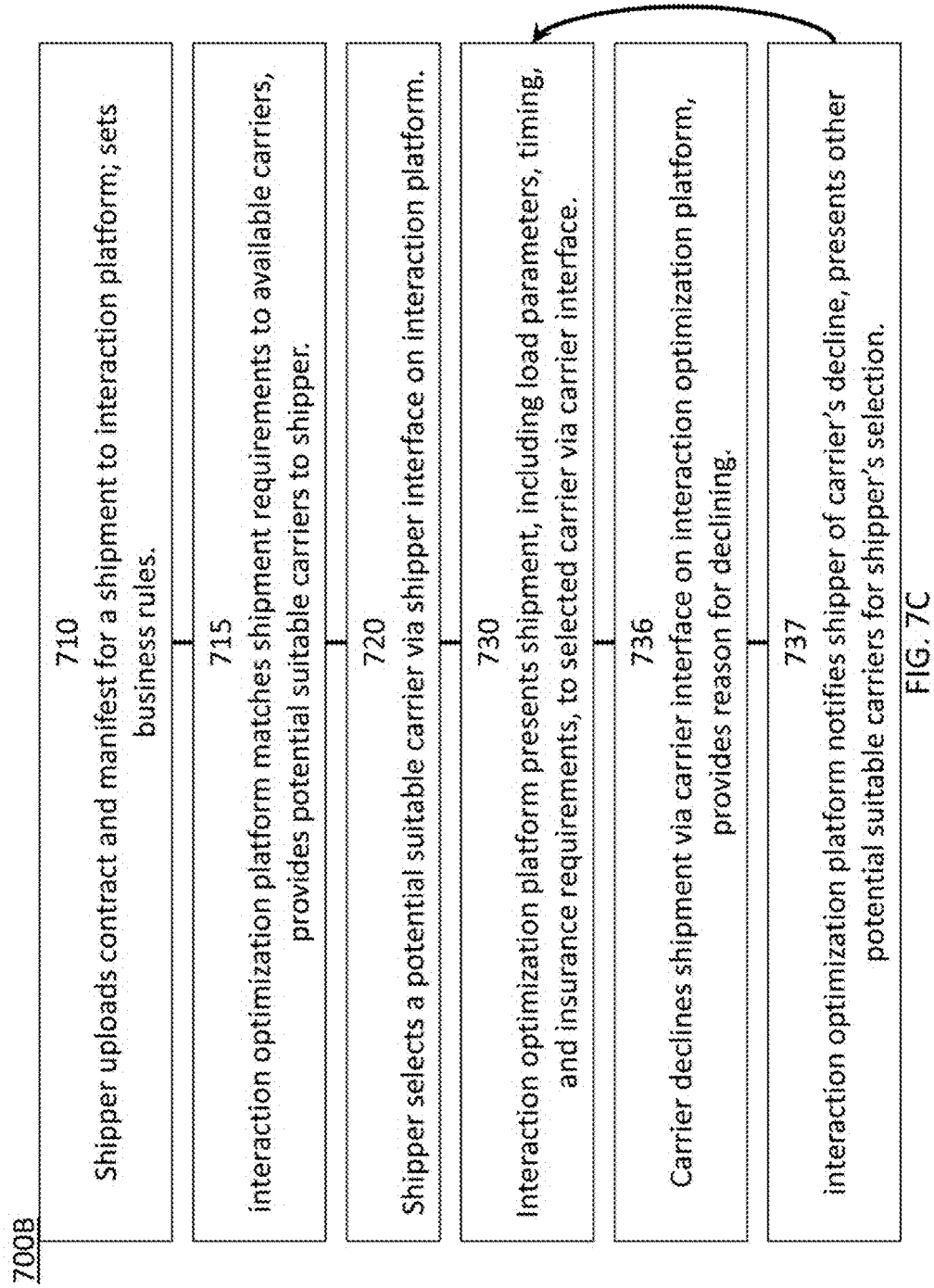

SHIPPER AND CARRIER INTERACTION OPTIMIZATION PLATFORM

CROSS-REFERENCE TO RELATED APPLICATION

This application is a continuation of, and claims priority under 35 U.S.C. § 120 to, U.S. patent application Ser. No. 14/794,619 filed Jul. 9, 2015 which claims priority under 35 U.S.C. § 119(e) to U.S. Provisional Patent Application Ser. No. 62/022,165 filed Jul. 8, 2014, the disclosures of which are hereby incorporated by reference in their entirety.

TECHNICAL FIELD

The subject matter described herein relates generally to the shipping of physical goods, particularly via land based vehicles such as truck, rail, and the like.

BACKGROUND

Matching shipments of goods to carriers can be a tedious undertaking. Currently, much of the matchmaking between shippers and carriers is carried out by third parties, such as brokers. The involvement of brokers, as well as the use of older means of communication and tracking can lead to increased costs or loss of potential income. The increased costs can include increased overhead payments to third parties, and loss of potential income can stem from increased time to find a carrier for each shipment, carriers moving equipment that is not fully utilized, and unexpected delays or exceptions that are not adequately communicated to the shipper.

SUMMARY

In one aspect, a shipper and carrier interaction optimization platform accepts input from one or more shippers and input from one or more carriers. The input from one or more shippers can include specifications for a shipment, a bid for use of a carrier's equipment, or both shipment specifications and a bid for use of a carrier's equipment. Specifications for a shipment can include a threshold or auto execute cost value, dates for the shipment, point of origin, destination, desired ratings score of the carrier, type of cargo, cargo handling needs, or any combination thereof. A bid for use of a carrier's equipment can include a proposed payment amount. The input from one or more carriers can include equipment availability information, a bid for the cost of transporting a shipment of cargo, or both equipment availability information and a bid for the cost of transporting a shipment of cargo. The equipment availability information can include the type of equipment available, the dates and time of availability, the threshold cost of hiring, an auto execute hiring value, availability origin location, availability destination location, and any combination thereof. A bid for the cost of transporting a shipment of cargo can include the hourly driver cost, the mileage cost for the equipment, fuel costs, special route costs (e.g., tolls), special handling costs upon loading or delivery, and any combination thereof. The platform can provide interfaces for tracking any shipment, for generating proof of delivery, for creating lists of preferred shippers or carriers, for generating cost estimates, for locating shipments with origins that coincide with the termination of one shipment, or any combination thereof.

In some implementations, a system for optimizing selection of a carrier for a shipment is provided that includes an interaction optimization platform, a server, and one or more mobile computing devices. The interaction optimization platform may include a shipper interface configured for receiving information input from a shipper regarding shipment requirements, a carrier interface configured for receiving input from a carrier regarding equipment capabilities and/or availability, and a progress interface configured to display shipment information. The server may be configured to accept input from the shipper interface and the carrier interface, execute on or more programs to match a carrier with one or more shipments, and accept information regarding the location of one or more mobile devices that execute the carrier interface. The one or more mobile computing devices can display one or more of the shipper interface, carrier interface, and/or progress interface.

In some implementations, one or more of the following features may be present in any suitable combination. The one or more mobile computing devices can include a mobile phone, a smart phone, a wearable computing device, a tablet computer, and/or a laptop computer. Each of the one or more mobile computing devices can include positioning software and/or hardware that can be configured to locate the mobile computing device using one or more of cellular phone signaling, wireless internet (Wi-Fi) signals, and satellite positioning. The one or more mobile computing devices can display the carrier interface. The one or more mobile computing devices can also accept input from the carrier interface and relay it to the server. The carrier's driver can use the one or more mobile computing device to at least provide shipment information to the server. The shipment information can include the shipment location. In some implementations, the progress interface can include one or more displays showing: a location of the shipment on a map; an estimated time until shipment pick-up; an estimated time until shipment delivery; an estimated time until a checkpoint is reached; a shipment exception; and/or any combination thereof. The shipper interface can be configured to accept information for each shipment for which a shipper is seeking a carrier. The information for each shipment can include: a load type, insurance requirements, a contact person for the shipment, a shipment origin, a shipment destination, a desired time for delivery, a proposed payment for carrying the shipment, or any combination thereof. The carrier interface can be configured to accept information for a carrier. The carrier information can include" carrier corporate information, equipment available from the carrier, equipment capability, insurance information, information for one or more drivers employed by the carrier, or any combination thereof. In such embodiments, the equipment capability can include refrigeration ability, hazardous material (hazmat) compatibility, size limitations, weight limitations, and any combination thereof. The insurance information in such implementations can include information regarding coverage under the following types of insurance: general liability, auto liability, cargo liability, workman's compensation, or any combination thereof.

In a related aspect, provided in some implementations is a method for optimizing shipper and carrier interaction that includes creating a shipper profile for a shipper using an interaction optimization platform, uploading a set of business rules associated with the shipper to a server using the interaction optimization platform, uploading a contract associated with a shipment belonging to the shipper to a server using the interaction optimization platform, and electing a carrier from one or more carriers presented by the interaction optimization platform as a potential suitable carrier. In the method, each potential suitable carrier can agree to conform to the set of business rules and contract associated with the shipment via a carrier interface of the interaction optimization platform. The interaction optimization platform can also confirm that each potential suitable carrier meets a set of shipment requirements defined by the shipper.

In a further related aspect, a method for optimizing shipper and carrier interaction is provided that includes creating a carrier profile for a carrier using an interaction optimization platform; installing, downloading, or activating a carrier interface on a mobile computing device associated with a driver who is associated with the carrier; accepting, using the carrier interface, a set of business rules and a contract for a shipment; and associating the shipment with the mobile computing device associated with the driver using the carrier interface. The mobile computing device may be configured to accept and/or generate location information for the mobile computing device and relay that location information to a server according to the interaction optimization platform.

Another related aspect provides a method for optimizing shipper and carrier interaction in some implementations, in which the method includes accepting a shipper profile via a shipper interface, accepting a carrier profile via a carrier interface, accepting a set of business rules from a shipper via the shipper interface, displaying one or more potential suitable carriers to the shipper via that shipper interface, accepting a selection from the shipper of one of the one or more potential suitable carriers to deliver the shipment, displaying information regarding the shipment to a selected potential suitable carrier for acceptance, associating the shipment with a mobile compute device associated with a selected river who is associated with the selected potential suitable carrier, accepting location information from the mobile computing device, and displaying: a location of the shipment on a map, an estimated time until shipment pick-up, an estimated time until shipment delivery, an estimated time until a check-point is reached, a shipment exception, and/or any combination thereof. The shipper profile, business rules, contract, and selection of one of the one or more potential suitable carriers can be submitted or made via a shipper interface. The carrier profile can be submitted via a carrier interface. The one or more potential suitable carrier can be displayed to the shipper via the shipper interface. The information regarding the shipment can be displayed to a selected potential suitable carrier for acceptance via the carrier interface. This information regarding the shipment can include the set of business rules, the contract, and the shipment requirements. The mobile computing device associated with a selected driver can be configured to present information to and accept input from the selected driver through the carrier interface.

One or more of the following features can be present in the implementations described herein in any suitable combination. In some implementations, the progress interface can be accessible from the shipper and/or carrier interfaces. The method can also include defining one or more geo-fences, in which each geo-fence includes a defined distance from a check-point, origin, destination, or other significant location along a shipment route. In some such implementations, the method can also include generating and/or displaying an alert when the selected driver breaches any of the one or more geo-fences. The method can also include receiving confirmation of delivery of the shipment from the selected driver, as well as sending notification of delivery in real-time to the shipper and/or carrier. The confirmation of delivery can be sent using the carrier interface. The method can also include displaying, to the shipper via the shipper interface, estimated time for one or more of: arrival of driver for pick-up of the shipment, acceptance of the shipment, confirmation of the shipment details, departure of the shipment, and arrival of the shipment at its destination. In some implementations, the method can further include accepting an electronic version of a shipment manifest from the shipper and delivering the shipment manifest to the selected driver. The method can include sending a message to one or more drivers associated with the carrier, in which the message instructs each of the one or more drivers to install an interface optimizing platform that includes the carrier interface to a mobile computing device that accompanies the driver during shipments. The mobile computing device can send location information to the interaction optimizing platform, and the location information can include one or any combination of the following: GPS information, cellular phone signal information, wireless internet (Wi-Fi) information, as well as information derived from GPS, cellular phone signals, and/or wireless internet signals.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIGS. 7A-7C show exemplary flow charts of shipper and carrier interaction via the interaction optimization platform.

When practical, similar reference numbers denote similar structures, features, or elements.

DETAILED DESCRIPTION

A platform that allows for interaction between shippers and carriers through the internet is provided. The platform allows for shippers to post their shipping needs, for carriers to post their equipment and workforce availability, and for both shippers and carriers to bid on the opportunity to use equipment or provide shipping services, respectively. In addition to facilitating interaction which leads to hiring or service providing contracts, the platform can provide tools to track each shipment, to estimate the arrival time of each shipment, to account for delivery or shipment exceptions, to estimate the cost for any shipment, to estimate the break-even point for any shipment, to generate proof of delivery, to suggest shipments or equipment availability to optimize efficiency or best meet needs, or any combination thereof.

Figure 1:
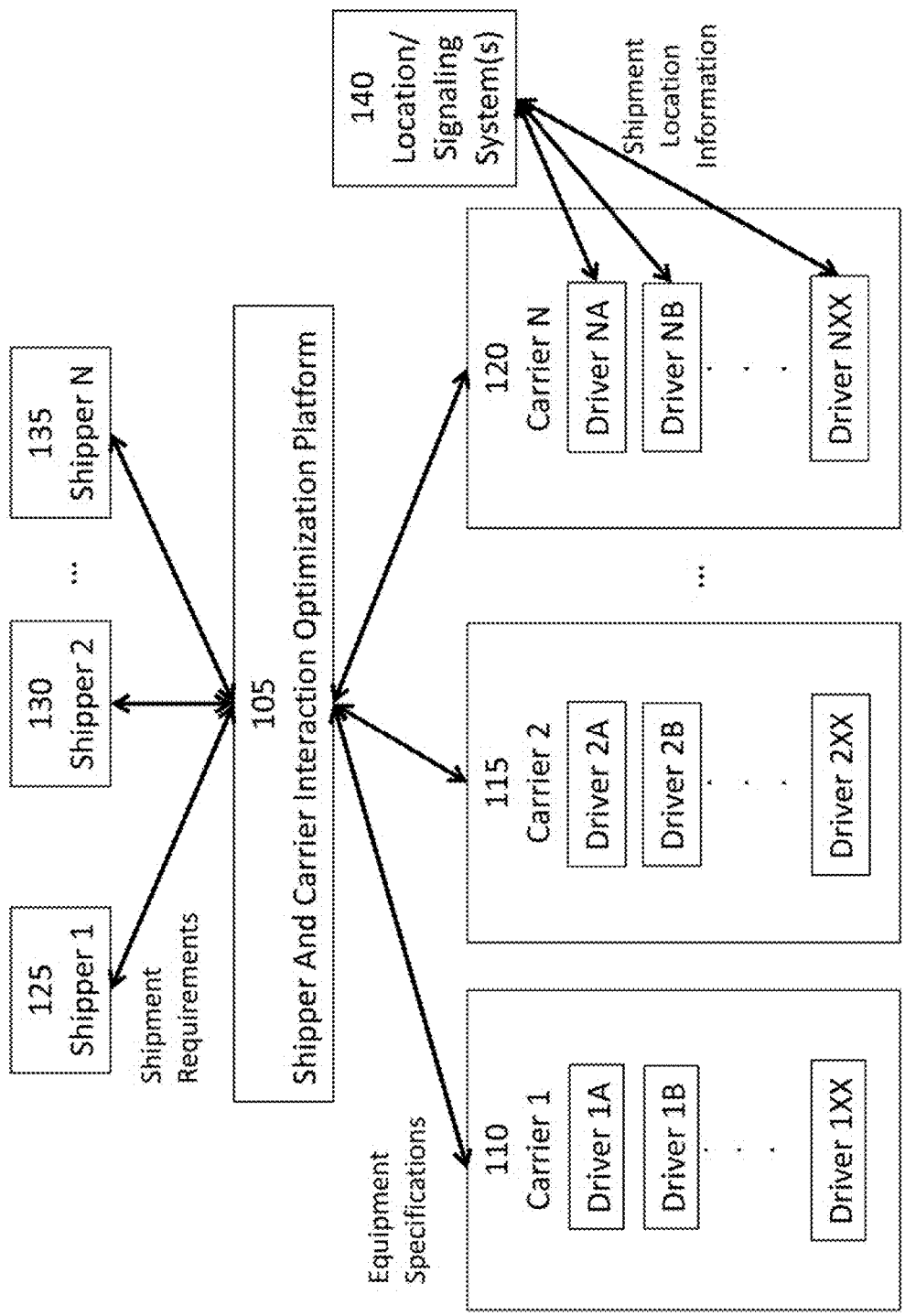
FIG. 1 is a diagram illustrating an exemplary system that includes a shipper and carrier interaction optimization platform for interaction between one or more shipper and one or more carrier.

FIG. 1 is a diagram illustrating an exemplary system that includes a shipper and carrier interaction optimization platform 105 for interaction between one or more carriers 110, 115, 120 and one or more shippers 125, 130, 135. Each carrier 110, 115, 120 can employ multiple drivers. The one or more shippers 125, 130, 135 can provide input to the shipper and carrier interaction optimization platform 105. This input from the one or more shippers can include shipment requirements and/or bids to ship using available equipment. The one or more carriers 110, 115, 120 can provide input to the shipper and carrier interaction optimization platform 105. This input from the one or more carriers can include equipment specification and/or bids on the cost to ship one or more particular shipments. These inputs, as well as information from the shipper and carrier interaction optimization platform 105 to each of the one or more carriers and one or more shippers will be described in further detail, herein below. The system can also include location and/or signaling systems 140 that work with a mobile computing device used by drivers. The location and/or signaling systems 140 can include GPS location systems, wireless internet systems, cellular phone signaling systems, or a combination of those systems, or another wireless communication system that can receive data or generate data regarding the location of the mobile computing device. Knowing the location of a driver's mobile computing device while he or she is transporting a shipment can allow the interaction optimization platform to determine the location of the shipment and display progress information to the shipper and/or carrier.

The shipper and carrier interaction optimization platform can include one or more of a web-based user interface, such as a web site; a dedicated application for use on a hand-held device, such as an app; and a dedicated computing device with a graphical user interface. The hand-held device can be a tablet, smartphone, cell phone, wearable electronic interface such as an electronic watch, or the like. The shipper and carrier interaction optimization platform can accept input from one or more shipper and/or one or more carrier. The shippers and carriers associated with the shipper and carrier interaction optimization platform can be referred to as the associated shipping community.

Figure 2:
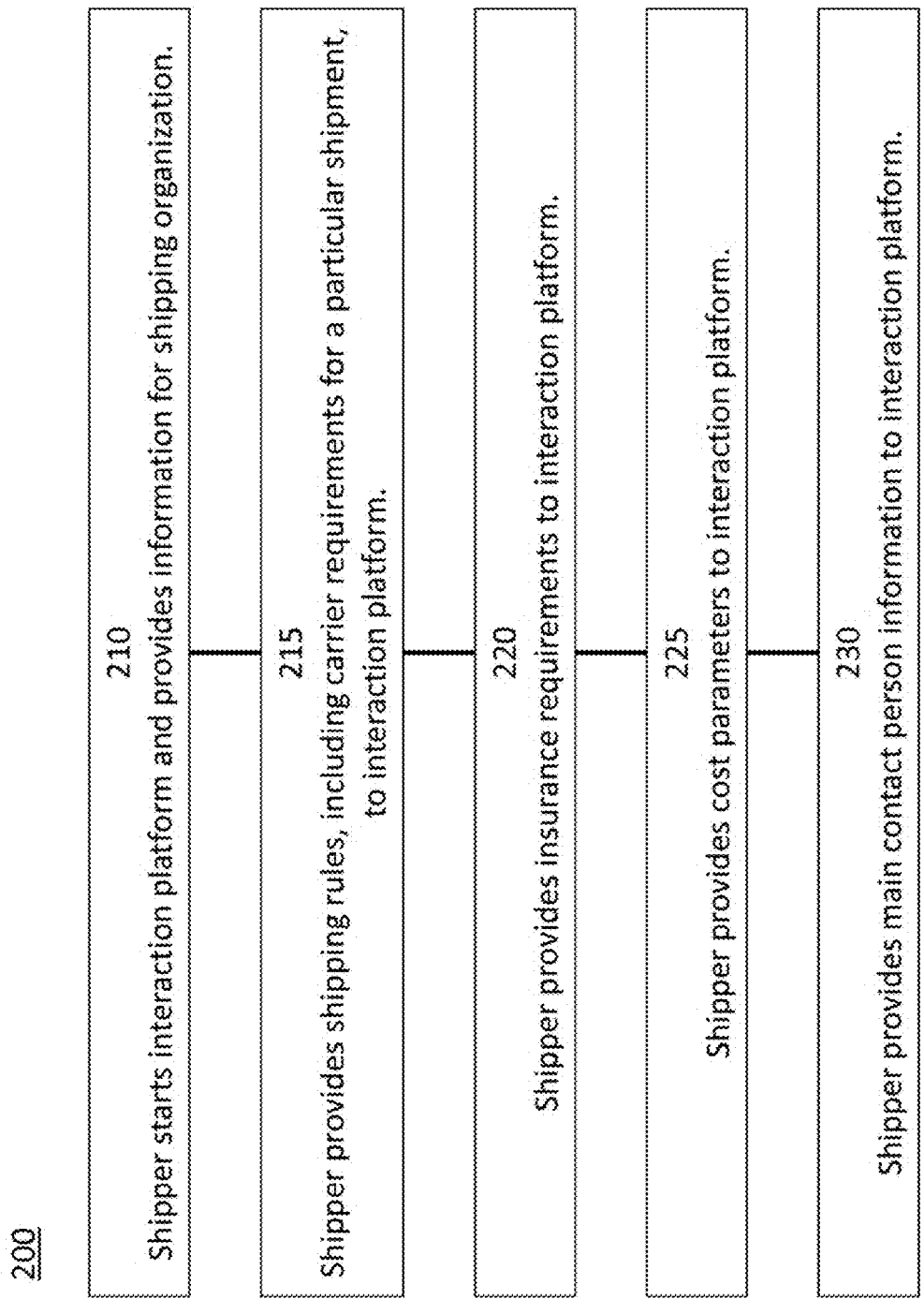
FIG. 2 shows a flow chart showing an exemplary method for creating a shipper profile on the interaction optimization platform described herein.

FIG. 2 shows an exemplary method 200 for a shipper to join the shipping community associated with the interaction optimization platform (105 in FIG. 1). The shipper can have an application for interfacing with the interaction optimization platform on a mobile computing device, or the shipper can use a web site to view a shipper interface generated by the interaction optimization platform. Once the shipper has initiated contact with the interaction optimization platform, he or she can provide information about the shipping organization to the platform, as in 210. The type of information is described more fully, below, but can include the company name, address, type of goods normally shipped, and the like. The shipping company can have rules, including carrier requirements, that are specified in 215 to better enable the interaction optimization platform to match a carrier to a shipment. The shipper can also provide insurance requirements 220, and cost limitations 225 to the interaction optimization platform to help narrow down the field of potential suitable carriers or to help the shipper create a suitable bid on the use of equipment for a shipment. The shipper can complete the profile for his or her shipping company by including the contact particulars for a person responsible for the proposed shipment, as in 230. This responsible person can be the default responsible person, shown in the system to always be responsible for shipments, or the responsible person can vary from shipment to shipment.

Figure 3A:
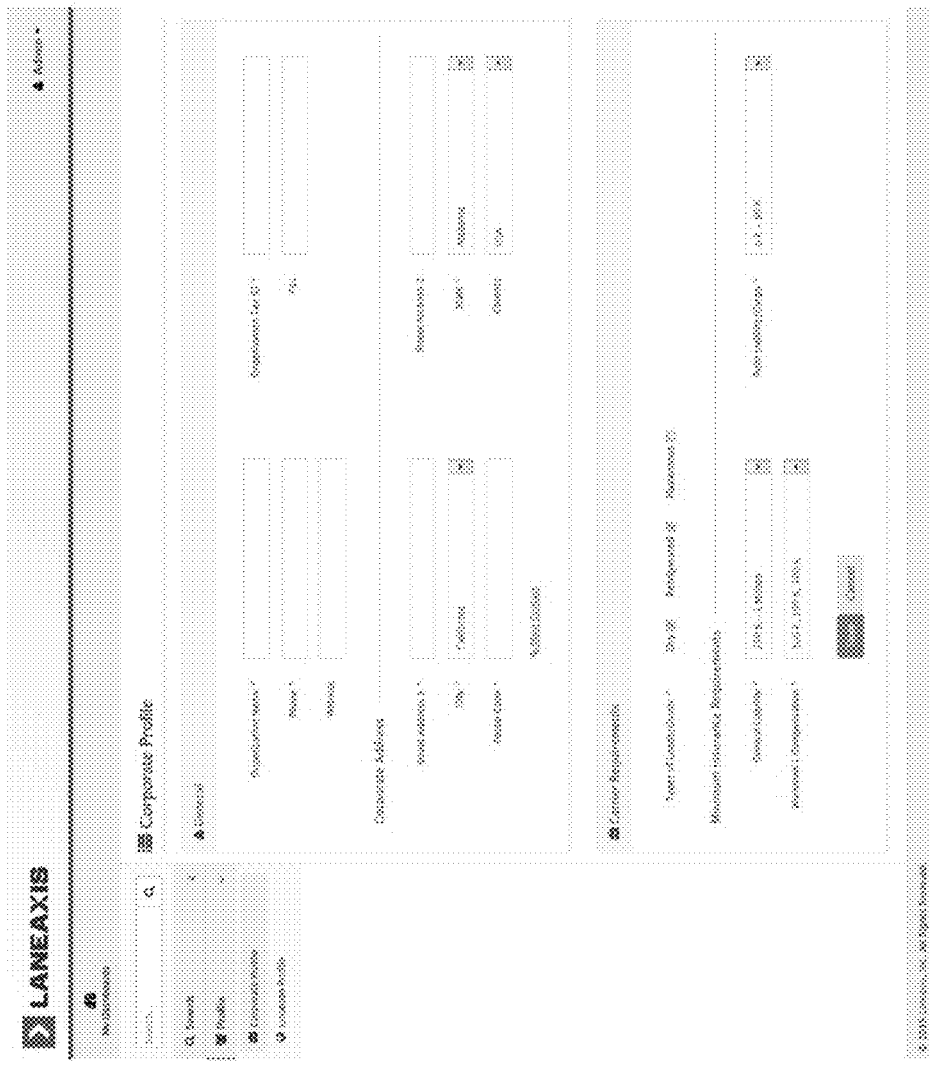
FIGS. 3A-3C show exemplary views of the shipper interface of the interaction optimization platform during profile set-up.
Figure 3B:
Figure 3C:

FIGS. 3A-3C show exemplary views of the shipper interface when setting up a shipper profile. In order for a shipper to create a shipper profile and join the associated shipping community, the shipper provides log-in information, shipper information (e.g., business name and address), criteria for carriers (e.g., CSA score requirement, insurance requirement, performance requirement, and the like), and a main contact, as seen in FIGS. 3A-3C. The shipper can also provide a list of preferred carriers to the shipper and carrier interaction optimization platform. Once the shipper has a profile and is a member of the associated shipping community, the shipper can upload one or more shipments/loads, either by providing an electronic file with the shipment data or by using the interface to provide the information. A shipper that is a member of the associated shipping community can also bid to use equipment posted as available.

Figure 4:
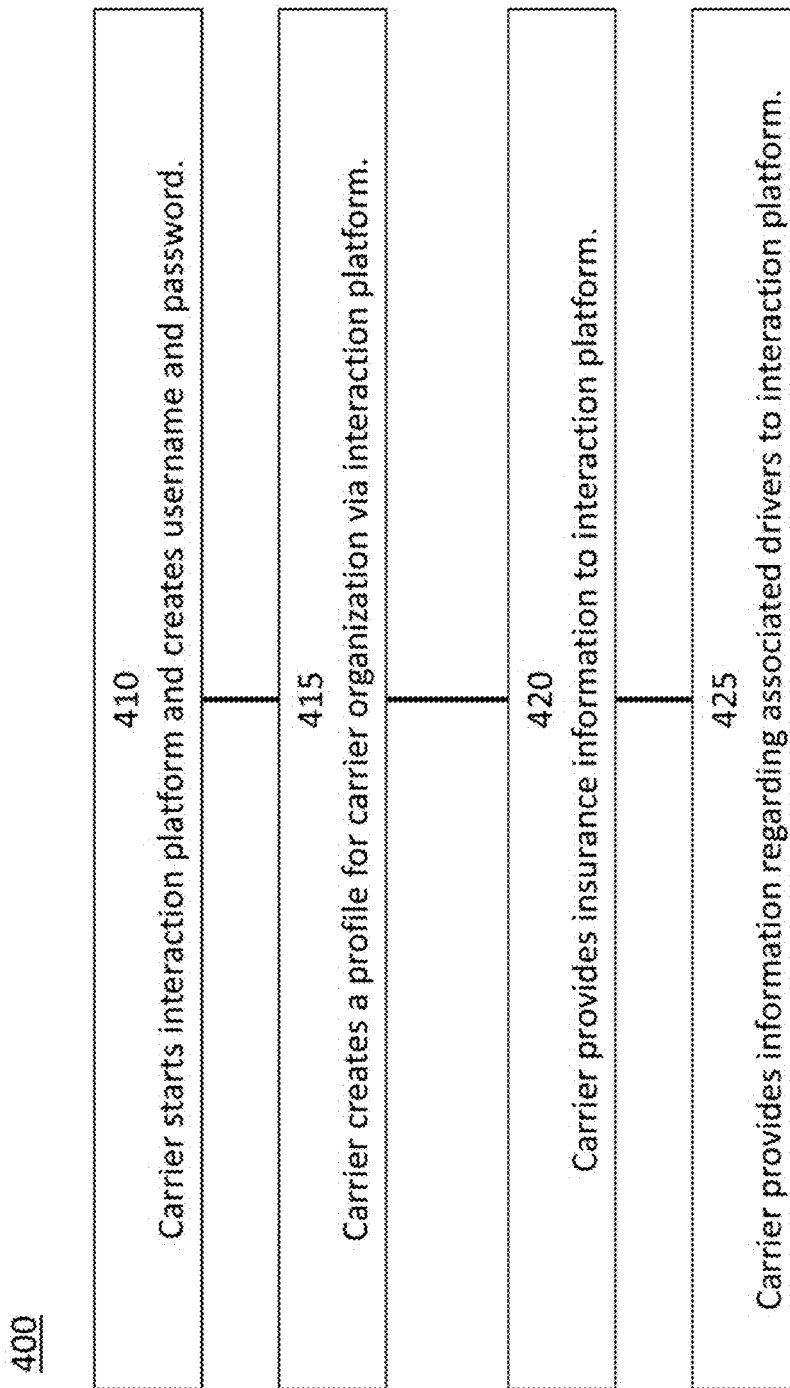
FIG. 4 shows a flow chart showing an exemplary method for creating a carrier profile on the interaction optimization platform described herein.

FIG. 4 shows an exemplary method 400 for creating a carrier profile for the interaction optimizing platform. The carrier can interact with the interaction optimizing platform via a carrier interface that is presented via a web site or a dedicated application (i.e. app) on a mobile computing device. The carrier can create a username and password upon starting up the carrier interface for the interaction optimizing platform, as in 410. The company information can be provided to the platform to create the barest of carrier profiles, as in 415. The insurance information provided, as in 420, as well as information about drivers associated with the carrier, as in 425, help to round out the creation of a carrier profile. The driver information can be provided by manually entering information into fields presented in the carrier interface. Alternatively, or additionally, driver information can be provided in a spread sheet, text delimited file, or as any other array of data in a file that is uploaded to the interaction optimization platform.

Figure 5A:
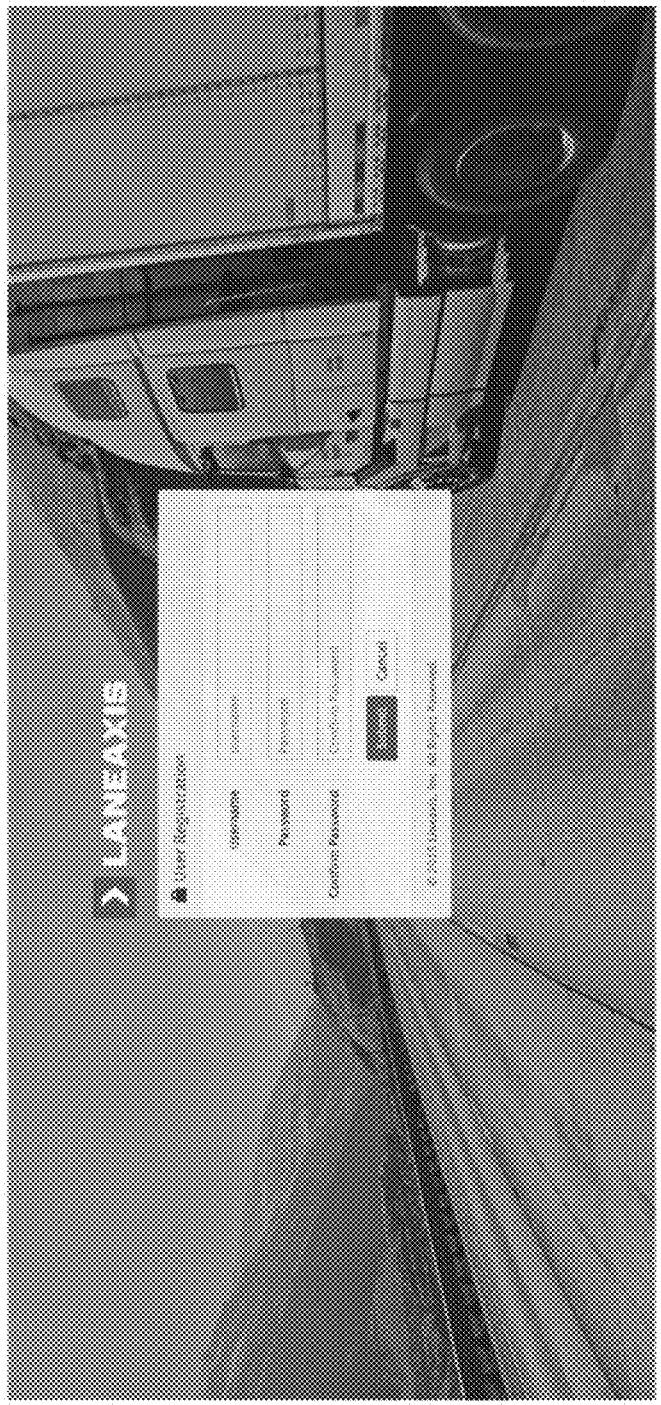
FIGS. 5A-5E show exemplary views of the carrier interface of the interaction optimization platform during profile set-up.
Figure 5B:
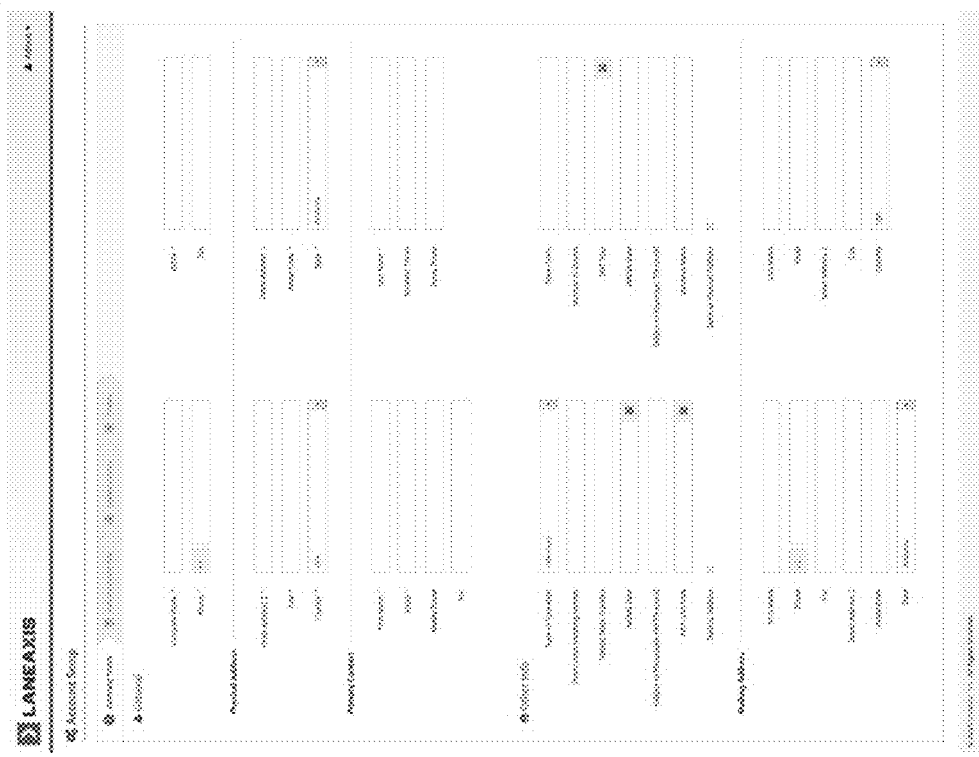
Figure 5C:
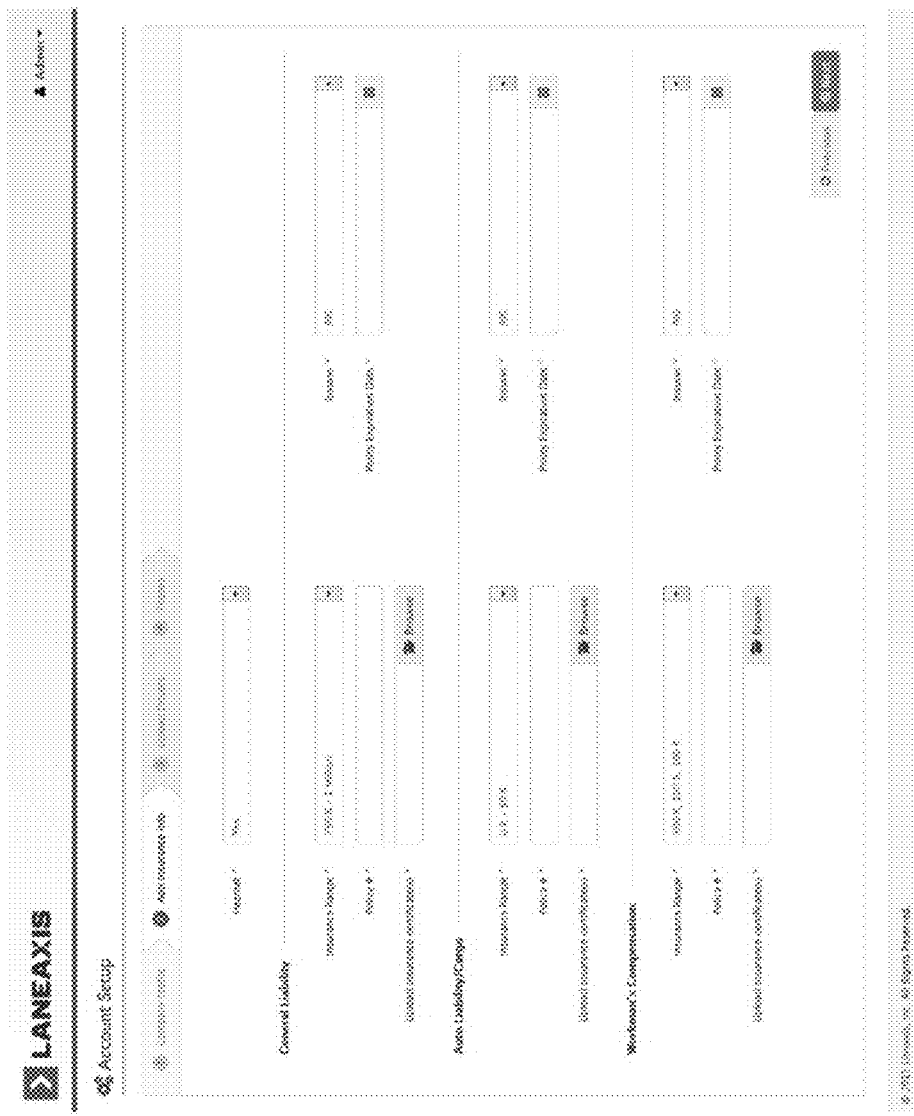
Figure 5D:
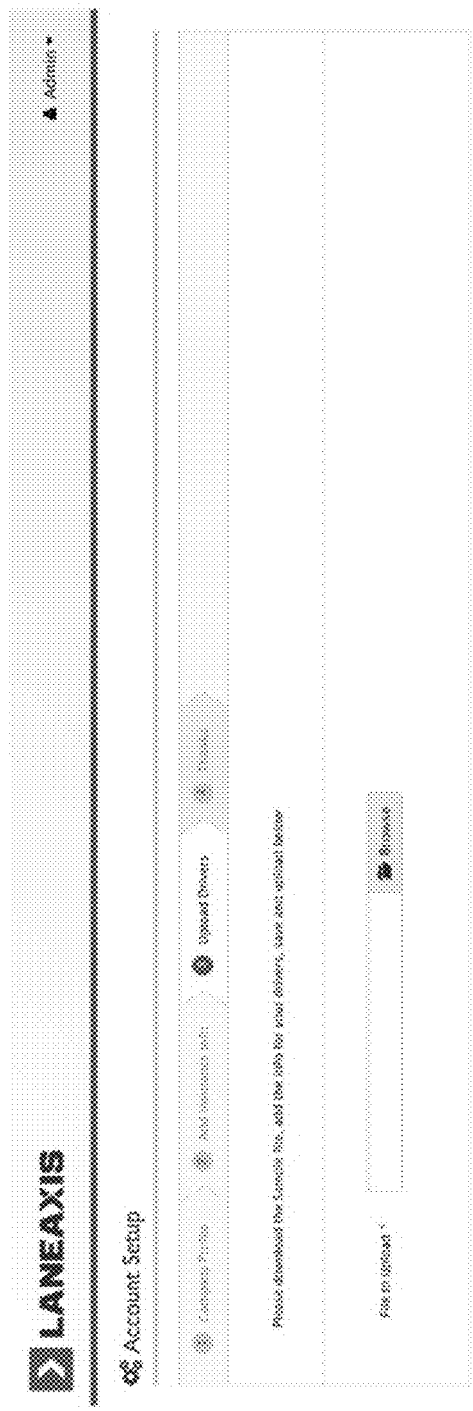
Figure 5E:
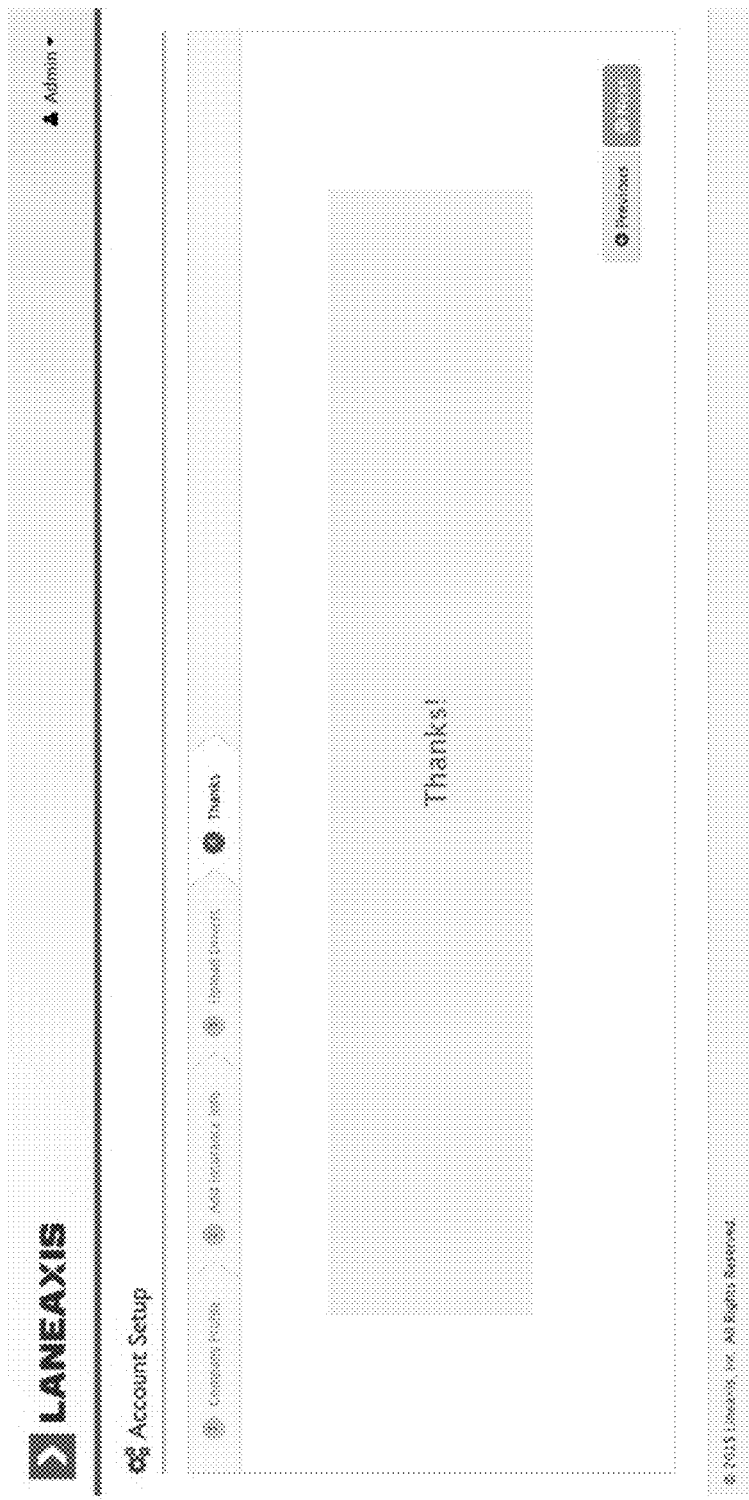

FIGS. 5A-5E are exemplary views of a carrier interface that can be seen when creating a carrier profile for the interaction optimization platform. A carrier can join the associated shipping community by providing log-in information (FIG. 5A) and registration information that can include a department of transportation (DOT) number, business name and address (FIG. 5B). The shipper and carrier interaction optimization platform can also accept insurance information (FIG. 5C) and equipment information from the carrier (FIG. 5B). The equipment information can include the equipment type, the maximum weight accepted by the equipment, and the carrier's equipment ID. The equipment type can include van, flatbed, refrigerated, and the like. The carrier can also provide driver information to the shipper and carrier interaction optimization platform by the carrier (FIG. 5D). The driver information can include each driver's name, each driver's mobile phone number, and the identification number or name assigned to each driver by the carrier. Additional information can be associated with each driver, such as the equipment he or she is authorized to operate, preferred routes, and the like. Once a carrier becomes a member of the associated shipping community, the carrier can post the availability of his or her equipment, as well as bid to be the carrier on shipments posted by shippers within the community.

Figure 6A:
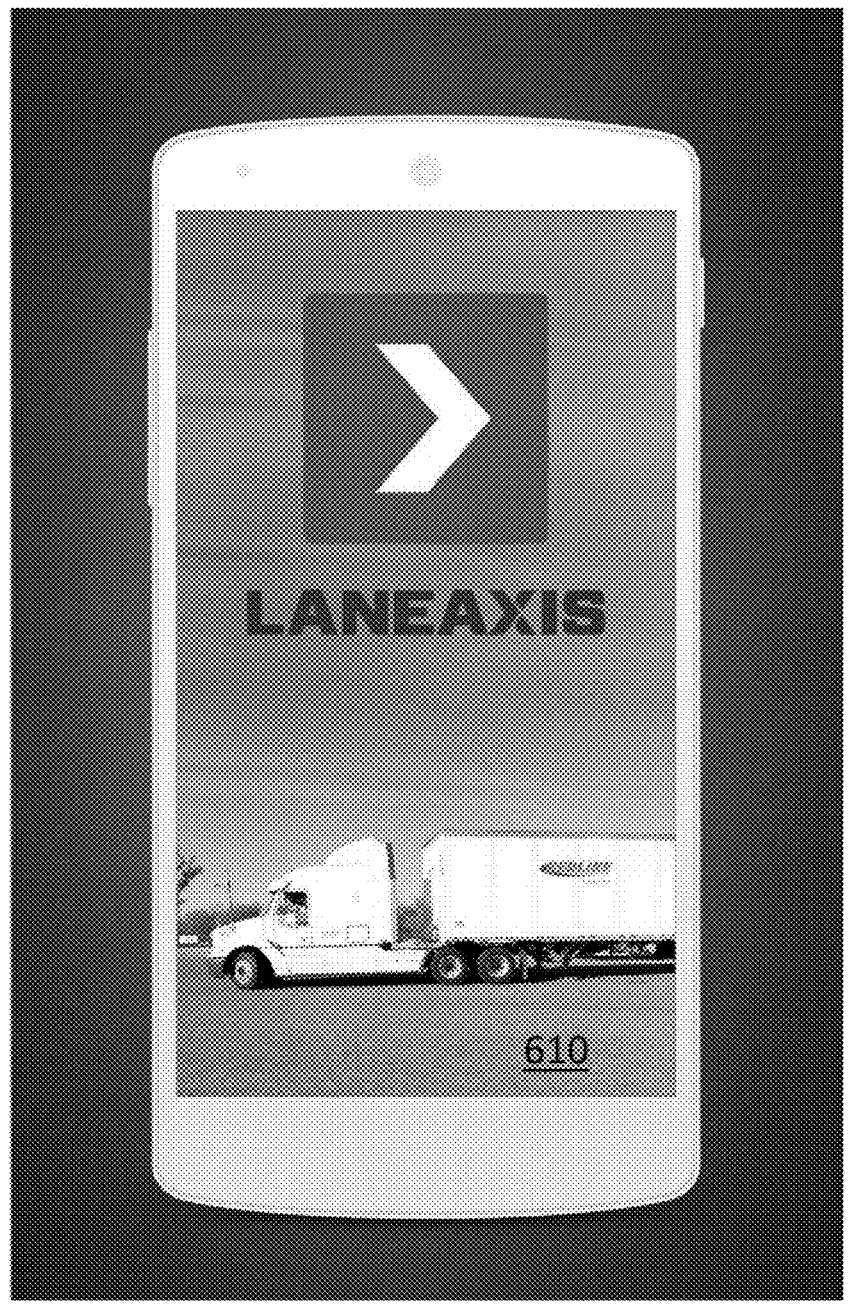
FIGS. 6A-6J show exemplary views of the carrier interface of the interaction optimization platform on a hand-held mobile device.
Figure 6B:
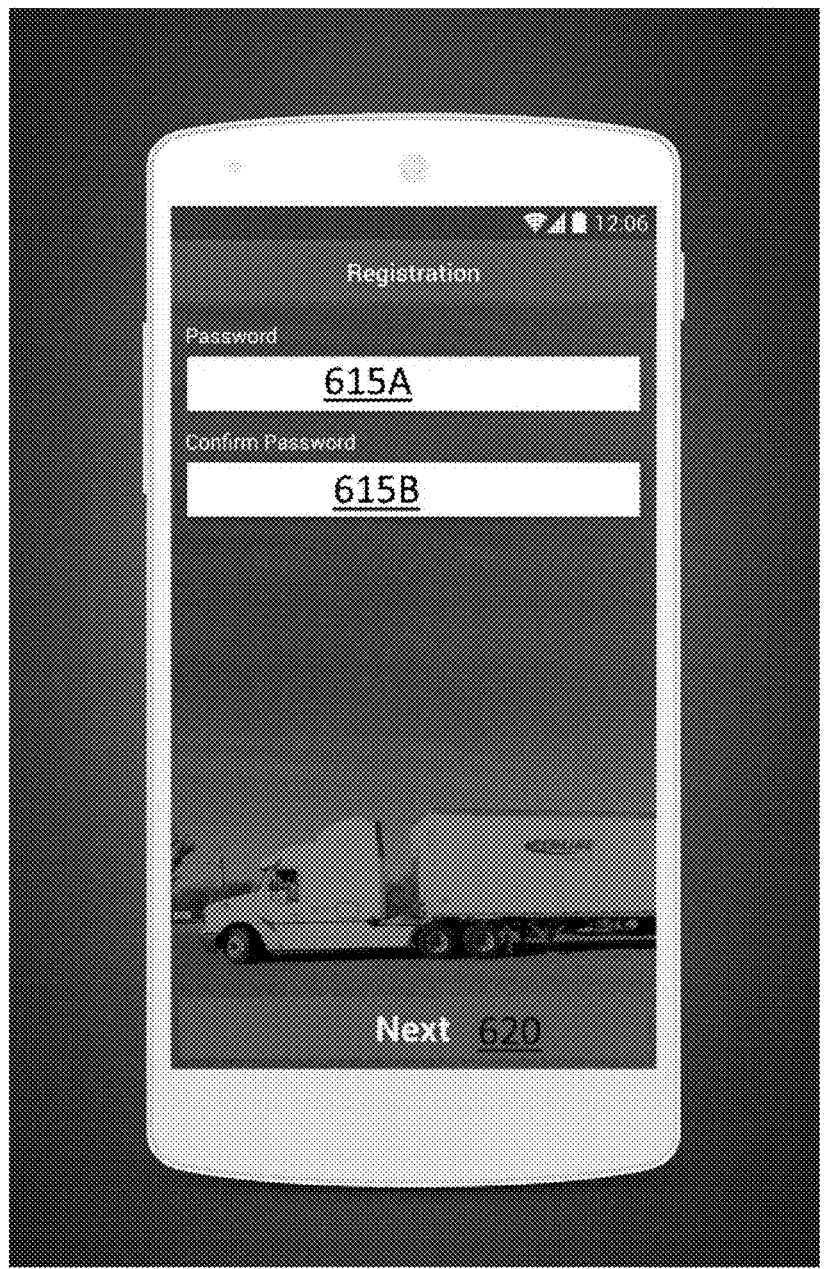
Figure 6C:
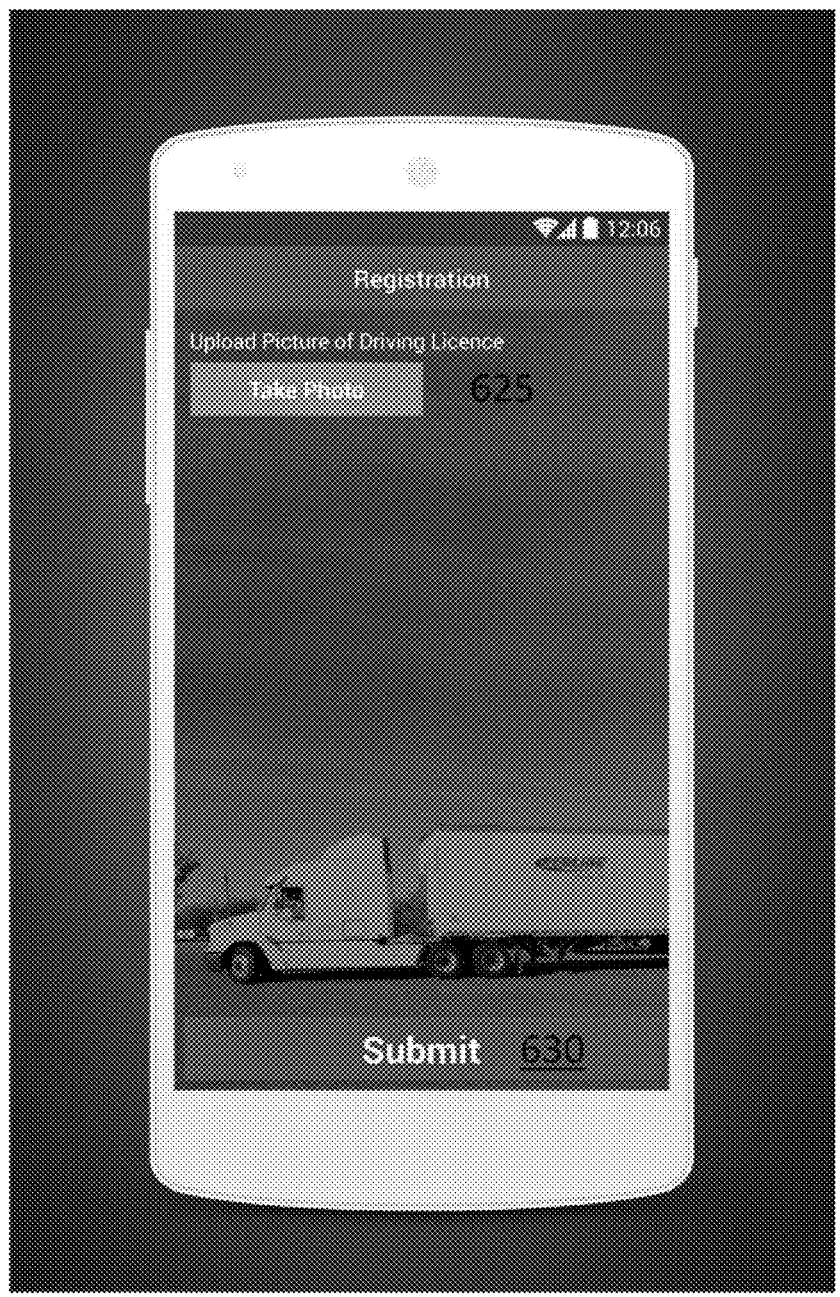
Figure 6D:
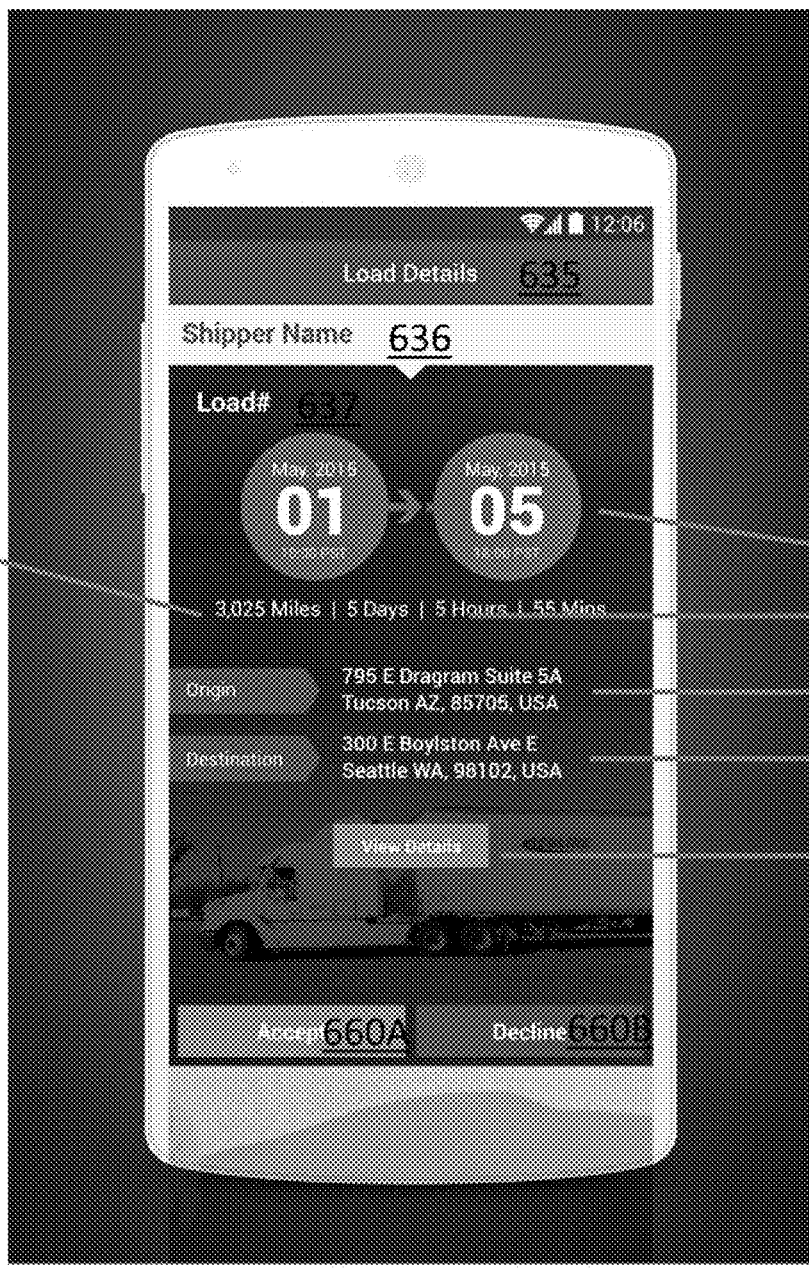
Figure 6E:
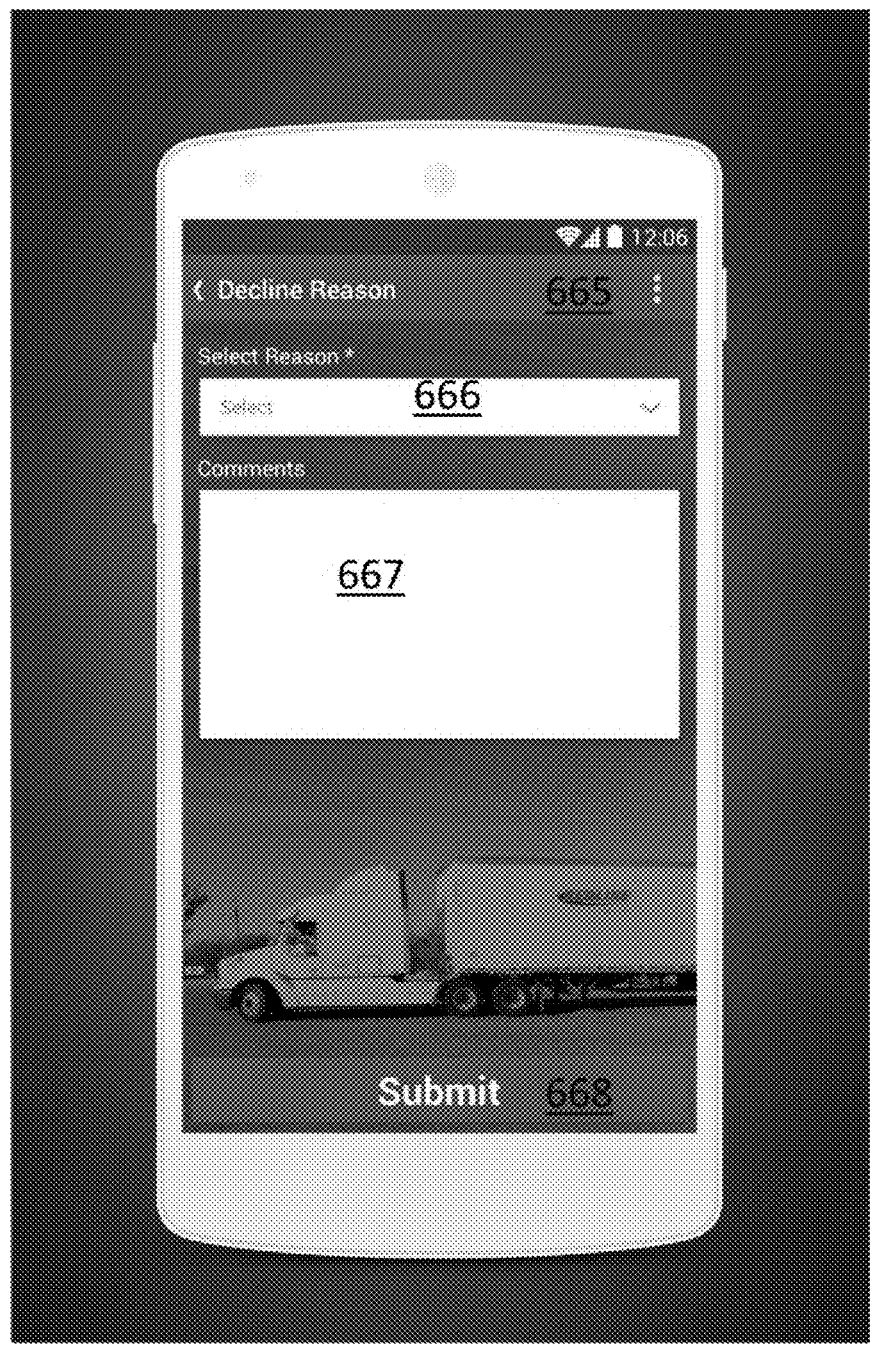

FIGS. 6A-6J are exemplary views of the carrier interface 600 as displayed on a mobile computing device, such as a driver's mobile phone or tablet device. FIG. 6A shows an exemplary landing page or starting view 610 for the carrier interface 600. FIGS. 6B and 6C show registration views of the carrier interface 600. The user (e.g., the driver) is prompted to enter a password in fields 615A and 615B, then select the next button 620. The user can then take a photo of his or her driver's license by selecting the appropriate button 625 and submit 630. The photo may be used to verify the driver's identity and credentials. FIG. 6D shows how a shipment, or load, may be presented in the carrier interface for acceptance. If the carrier accepts the shipment, then the carrier agrees to abide by the shippers business rules and contract and to deliver the shipment. The load details 635 can include the shipper name 636, load number 637, dates and times of the shipment start and end 638, the number of miles to cover 639, the expected time needed to deliver 640, the origin location 645, the destination location 650, and further details 655. The user, or driver, can opt to view more details 655 and see information such as further shipment requirements, an electronic copy of the shipment manifest, payment details, the main contact person, and the like. The driver or carrier can choose to accept 660A or decline the shipment 660B by selecting the appropriate button on the interface. FIG. 6E shows the view that can be seen when a driver or carrier selects decline 660B. The header indicates that a decline reason 665 is requested, and the driver can select a reason from the drop down menu 666 and/or write an explanation for declining the shipment 667. Once the reason for the decline is prepared, the reason can be submitted by selecting the appropriate button 668.

Figure 6F:
Figure 6G:
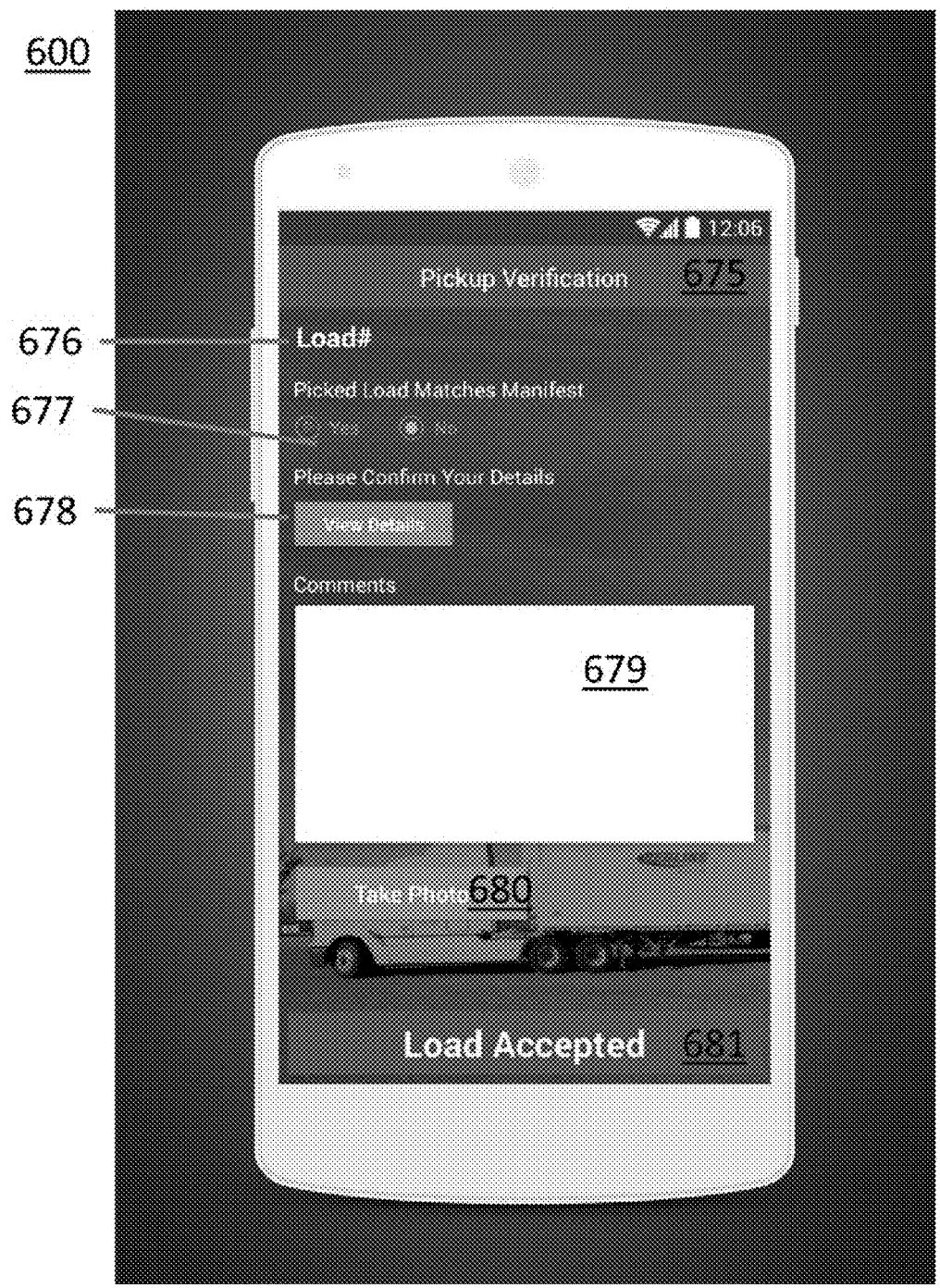

FIGS. 6F-6J show views that can be seen when a carrier or driver selects to accept 660A a shipment. The current load view 670, designated by a load number 671, is shown in FIG. 6F. This information can be useful when a carrier has queued up many loads along a route or in a finite time period ahead of time. The pickup verification view 675 is shown in FIG. 6G. This view provides the load number 676 and then provides ways for the driver or carrier to indicate details about the load or shipment as he or she took possession of it onto his or her equipment. For example, the driver can indicate whether the load matches the manifest 677, the route and shipment details can be confirmed 678, and comments can be noted 679. The comments can indicate unusual circumstances or occurrences during loading of the shipment. Should something be wrong, or if the driver would like to show the condition of the shipment before and/or after loading onto his or her equipment, the driver can take a photo 680 of the shipment. Once the shipment is successfully examined and/or loaded, the load can be accepted and an indication of this can be sent to the interaction optimization platform by selecting the load accepted button 681 on the carrier interface 600.

Figure 6H:
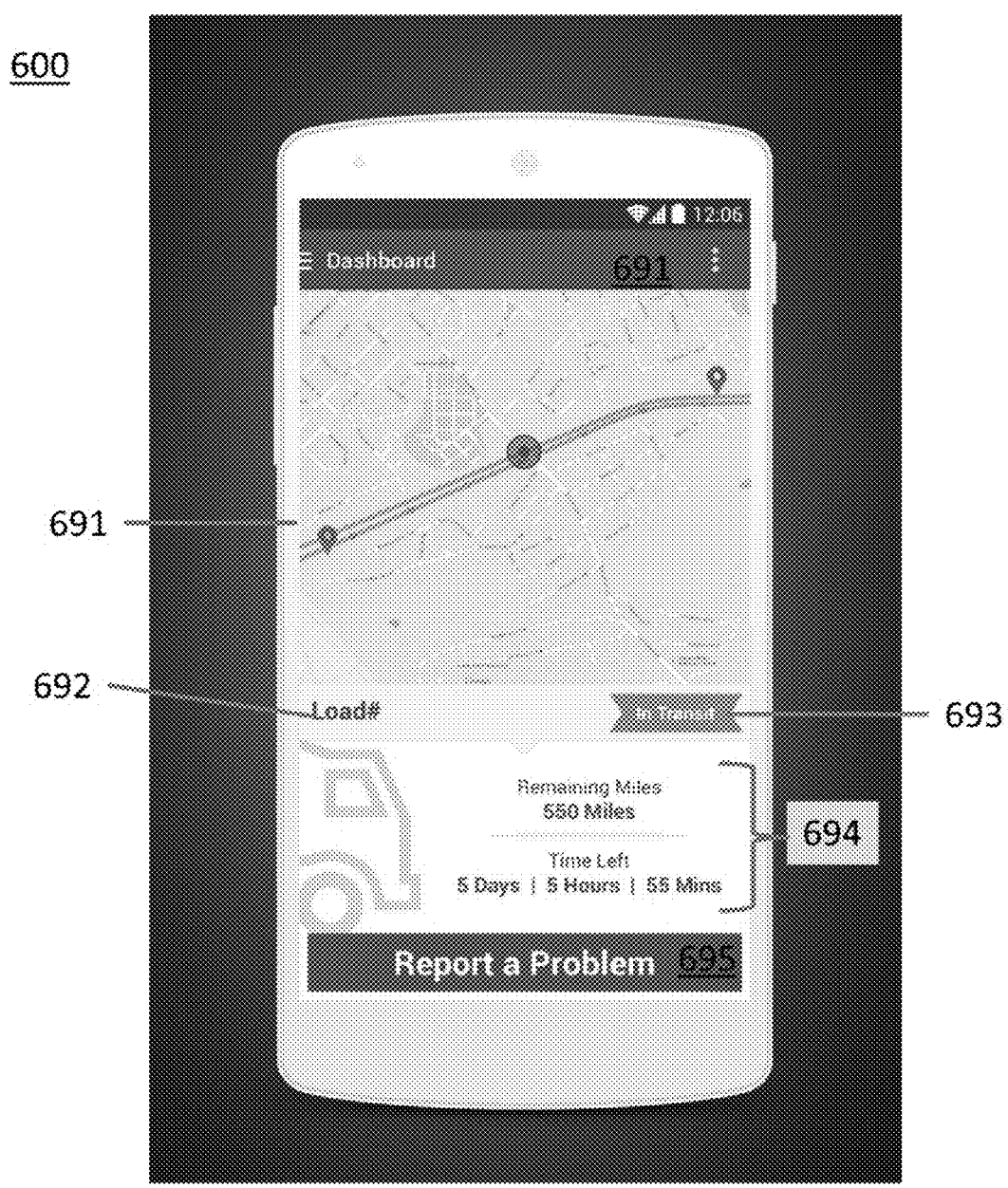
Figure 6I:
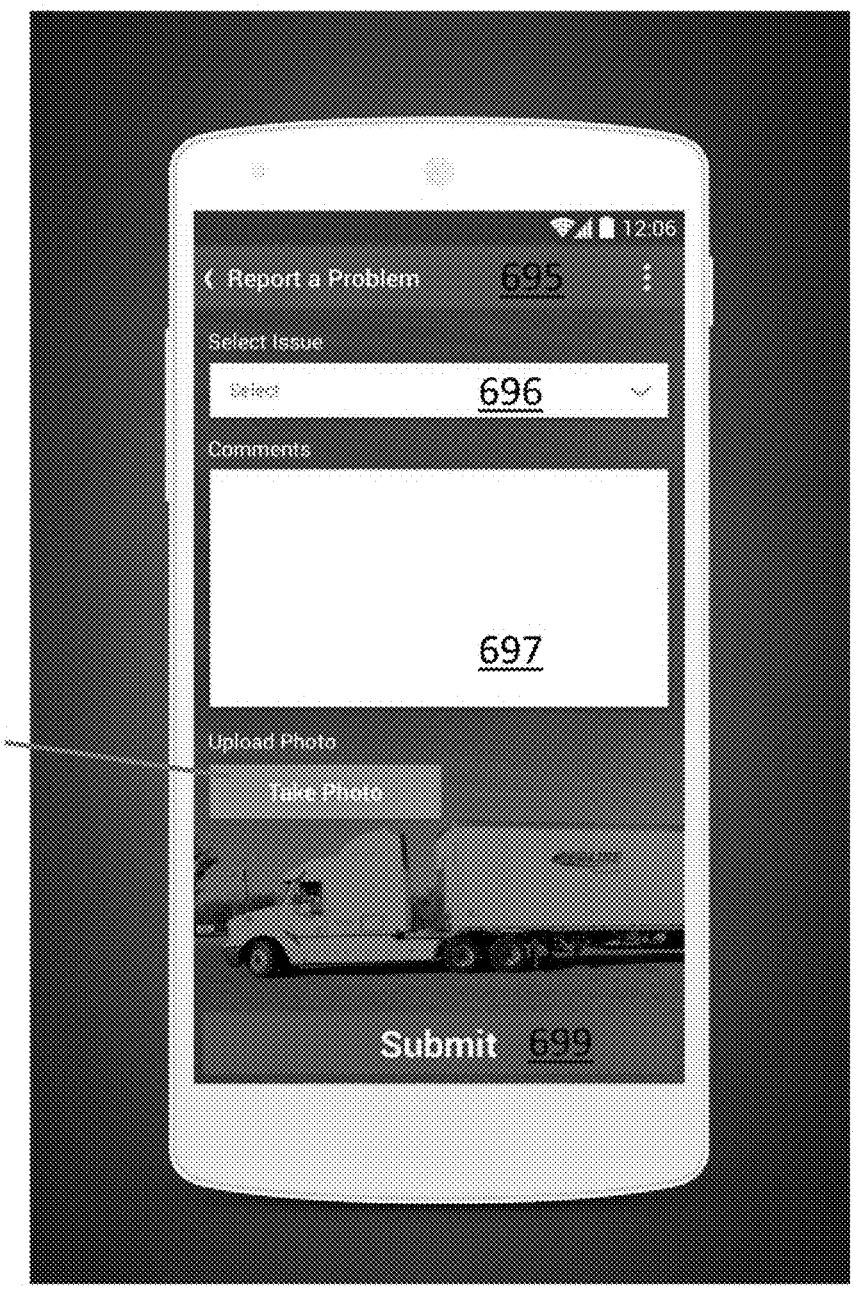
Figure 6J:
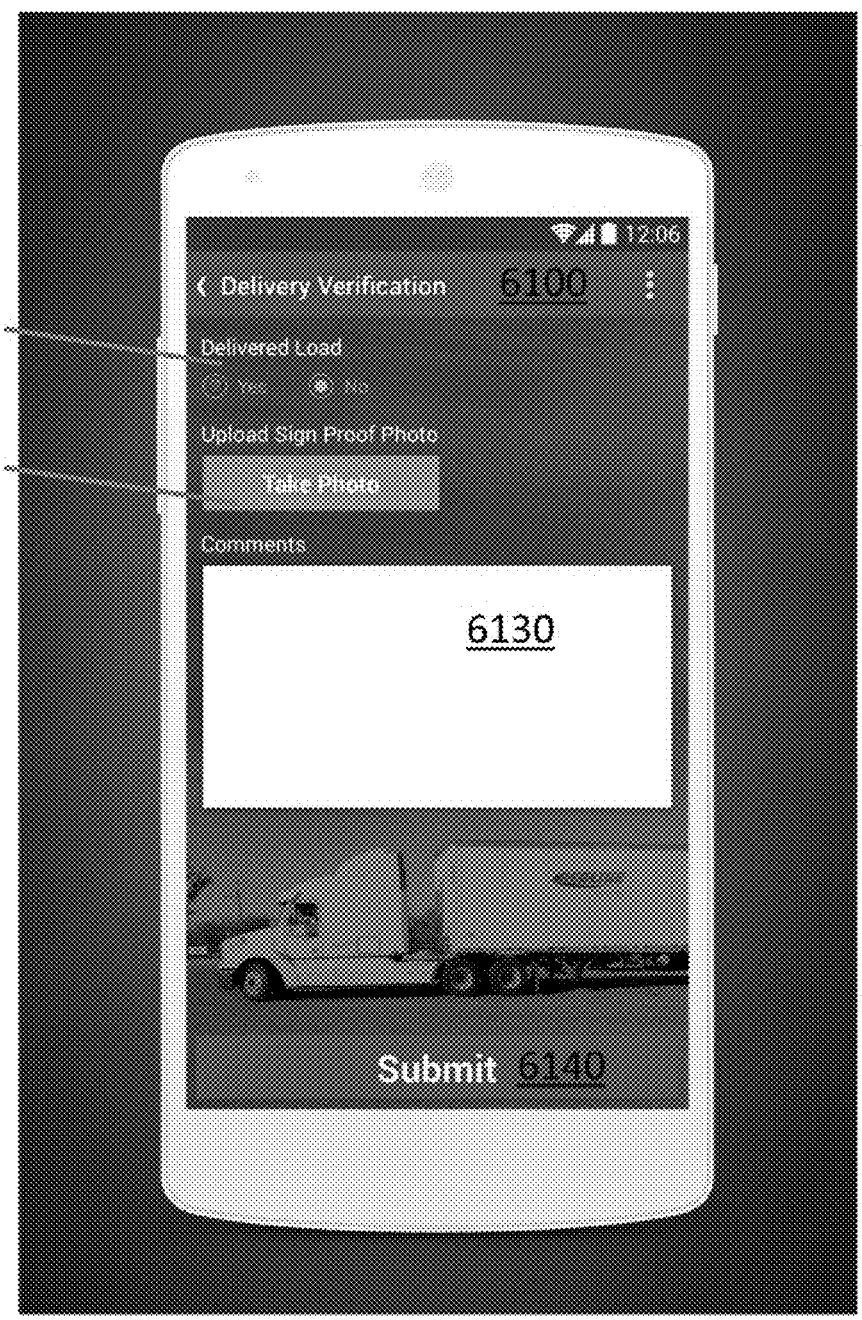

FIGS. 6H and 6I show the progress interface, or dashboard, 690 for the carrier interface of the interaction optimization platform. The progress interface can include a map 691; the shipment, or load, number 692; the shipment status 693; time and distance information 694; and the option to report a problem 995. The map 691 can include a view of the origin and destination of a shipment, the route that has been selected, and an indicator of the current location of the load. Checkpoints can be displayed on the map, particularly if the route is long or complicated, and the location of the shipment can be shown relative to the origin, destination, and/or any checkpoint. Once the shipment is a threshold distance or time away from a checkpoint or other significant location, and automatic alert can be sent to the shipper and/or carrier.

FIG. 6I shows an exemplary view of a problem or exception reporting interface. If a driver wishes to report a problem 695, the driver can indicate a type of issue 696 and provide comments or details 697. A photo can be associated with the problem by selecting the take photo button 698. Once all of the details have been provided by the driver, the information can be submitted to the platform by selecting the submit button 699. The problem can be automatically forwarded to the shipper and/or carrier (e.g., the carrier's driver supervisor or road side assistance dispatcher).

Once the shipment is delivered, the progress interface can automatically switch to the delivery verification view 6100. Alternatively, or additionally, the driver can select the delivery verification view once shipment delivery is eminent. In this view, seen in FIG. 6J, delivery of the load can be indicated with the push of a button 6110, and proof of signature by the accepting party at the destination can by recorded digitally 6120. Comments can be recorded, as well, 6130, such as information regarding the final condition of the shipment and the like. Once this information has been input into the carrier interface, it can be submitted by selecting the submit button 6140. Delivery notification can be automatically delivered to the shipper and/or carrier once the submit button 6140 is selected.

Figure 7A:
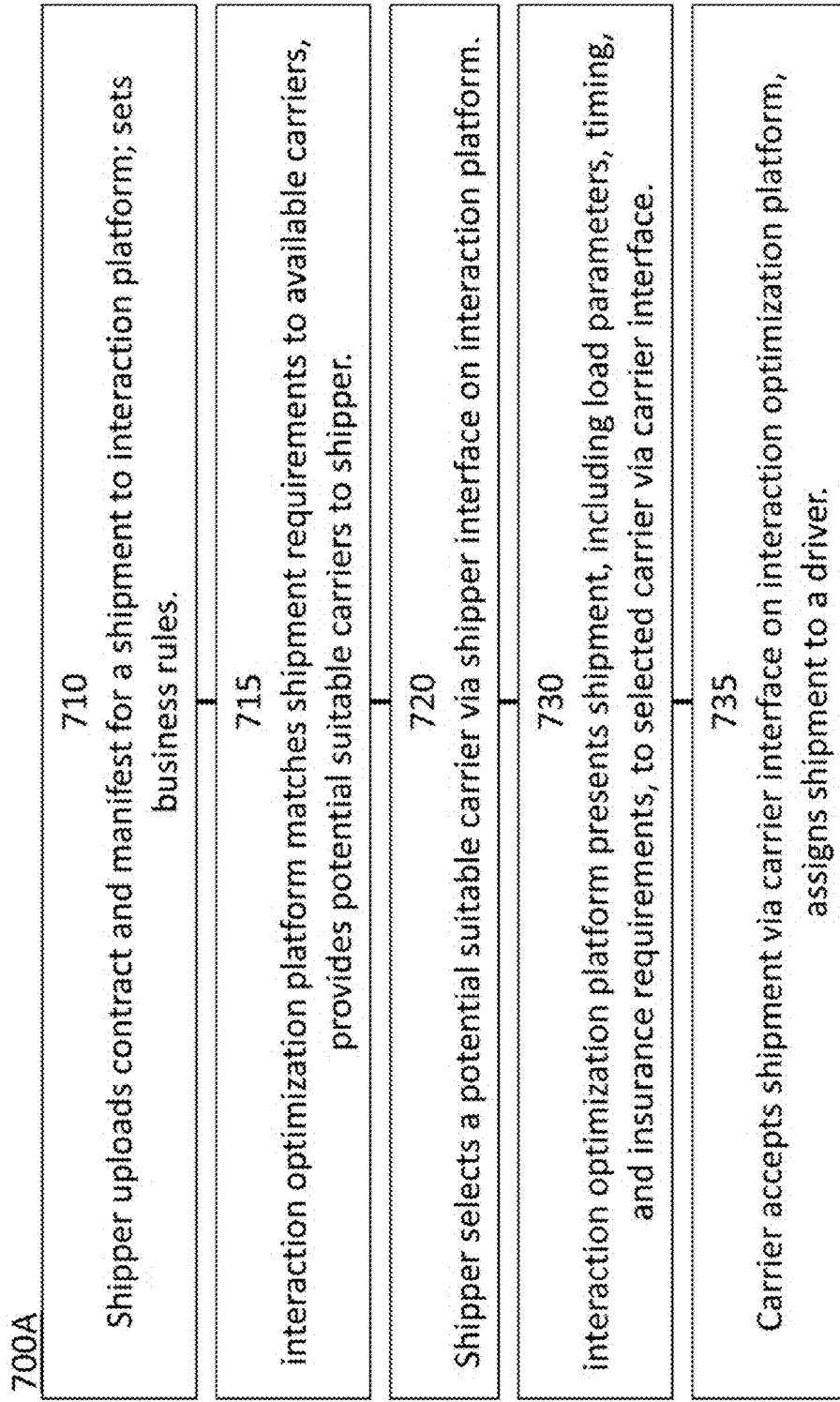
Figure 7B:
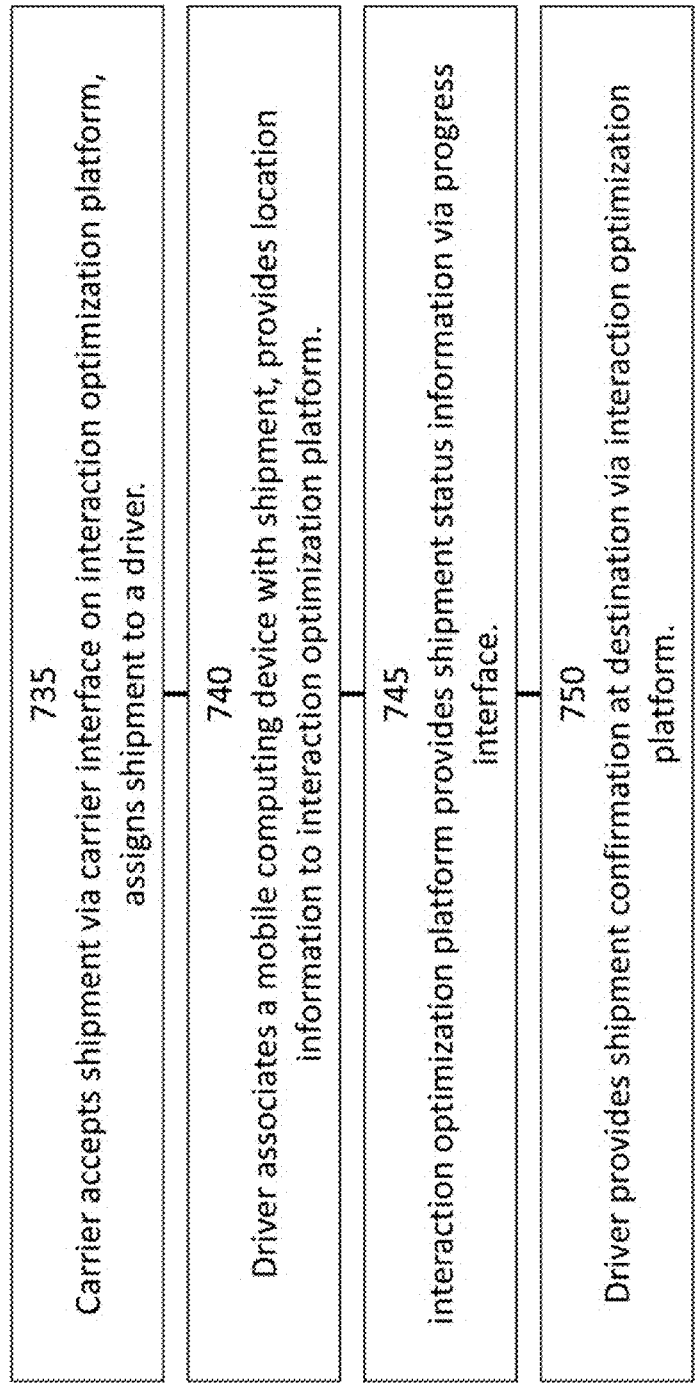
Figure 8A:
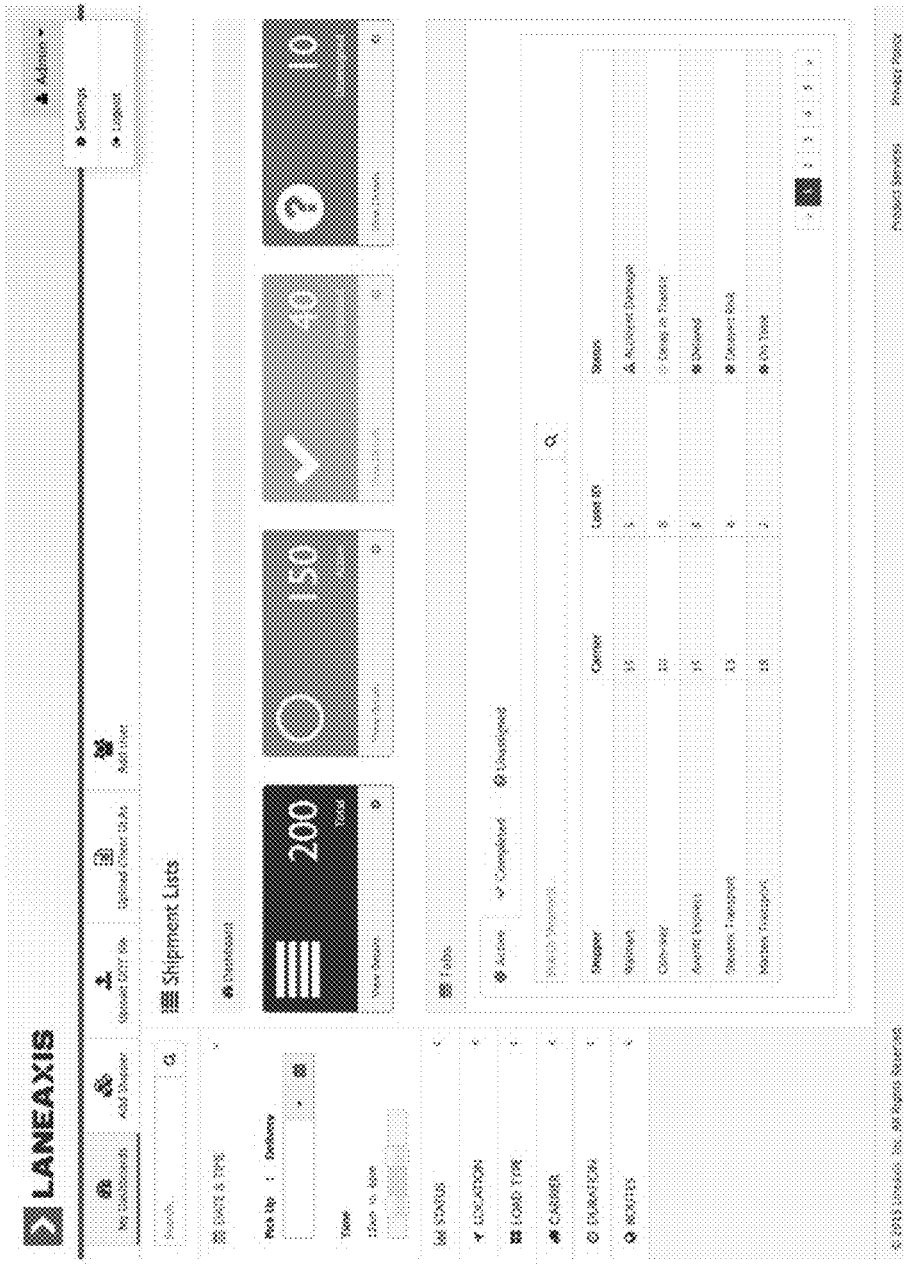
FIGS. 8A-8H show representative views of the interaction optimization platform, as in some implementations described herein.
Figure 8B:
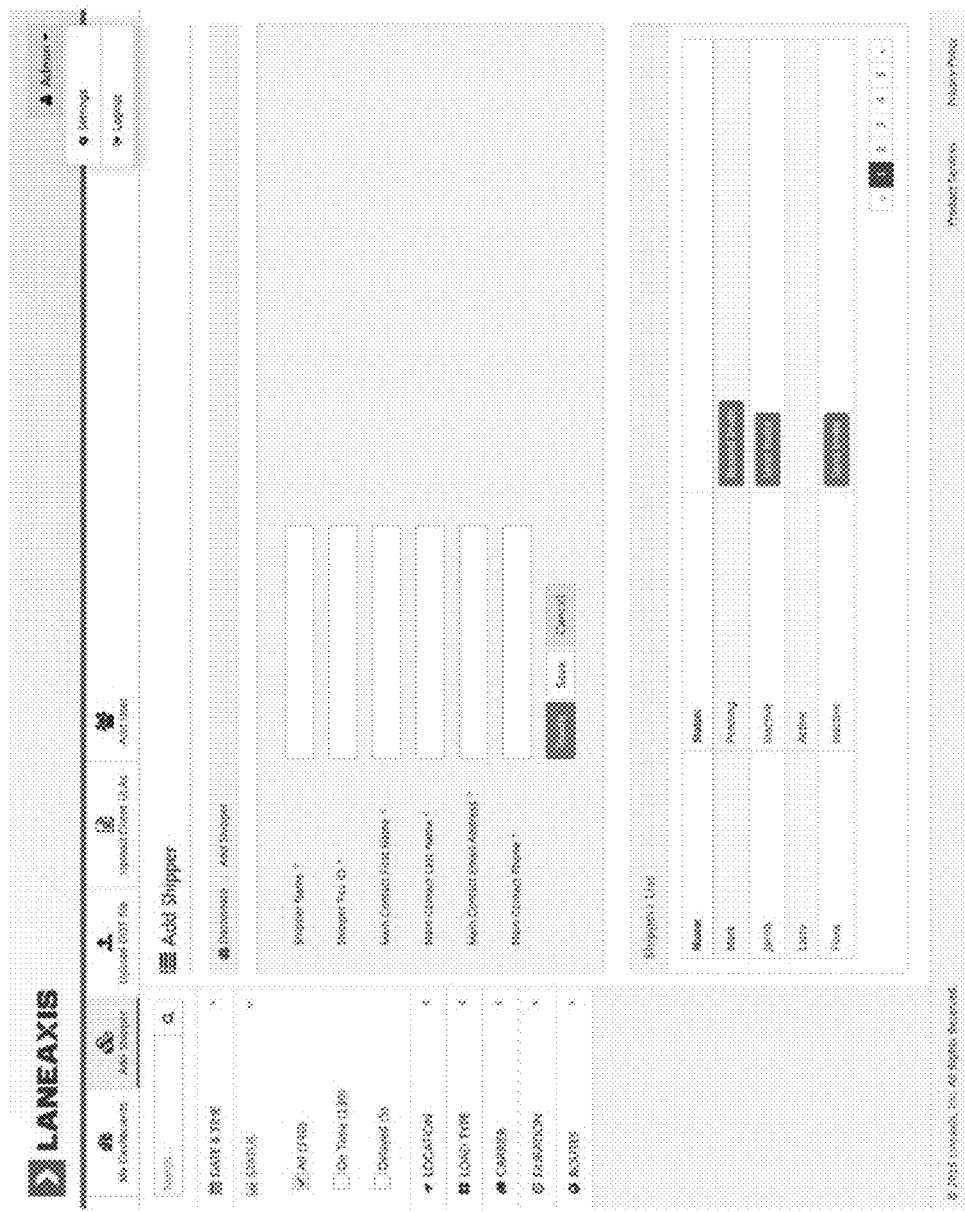
Figure 8C:
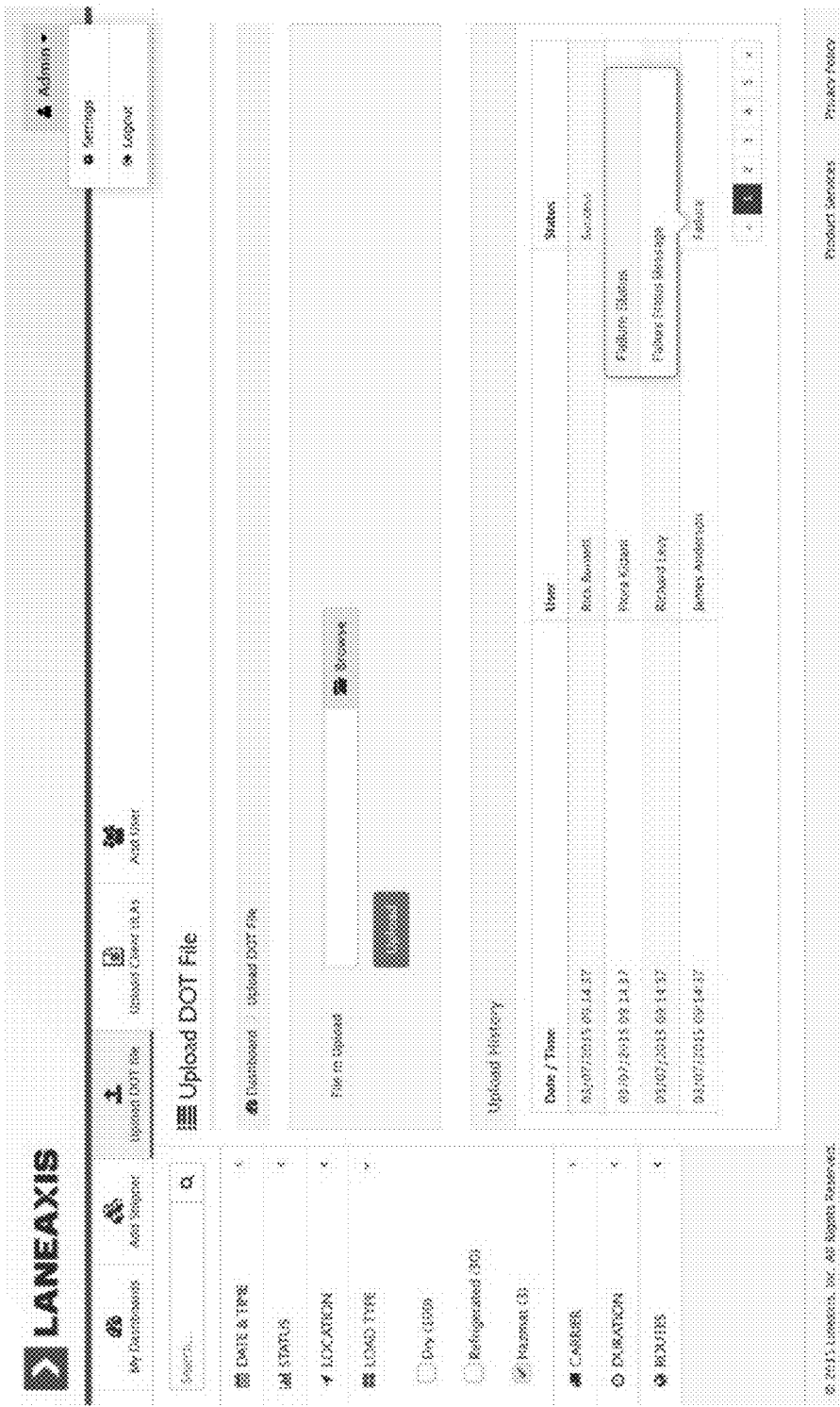
Figure 8D:
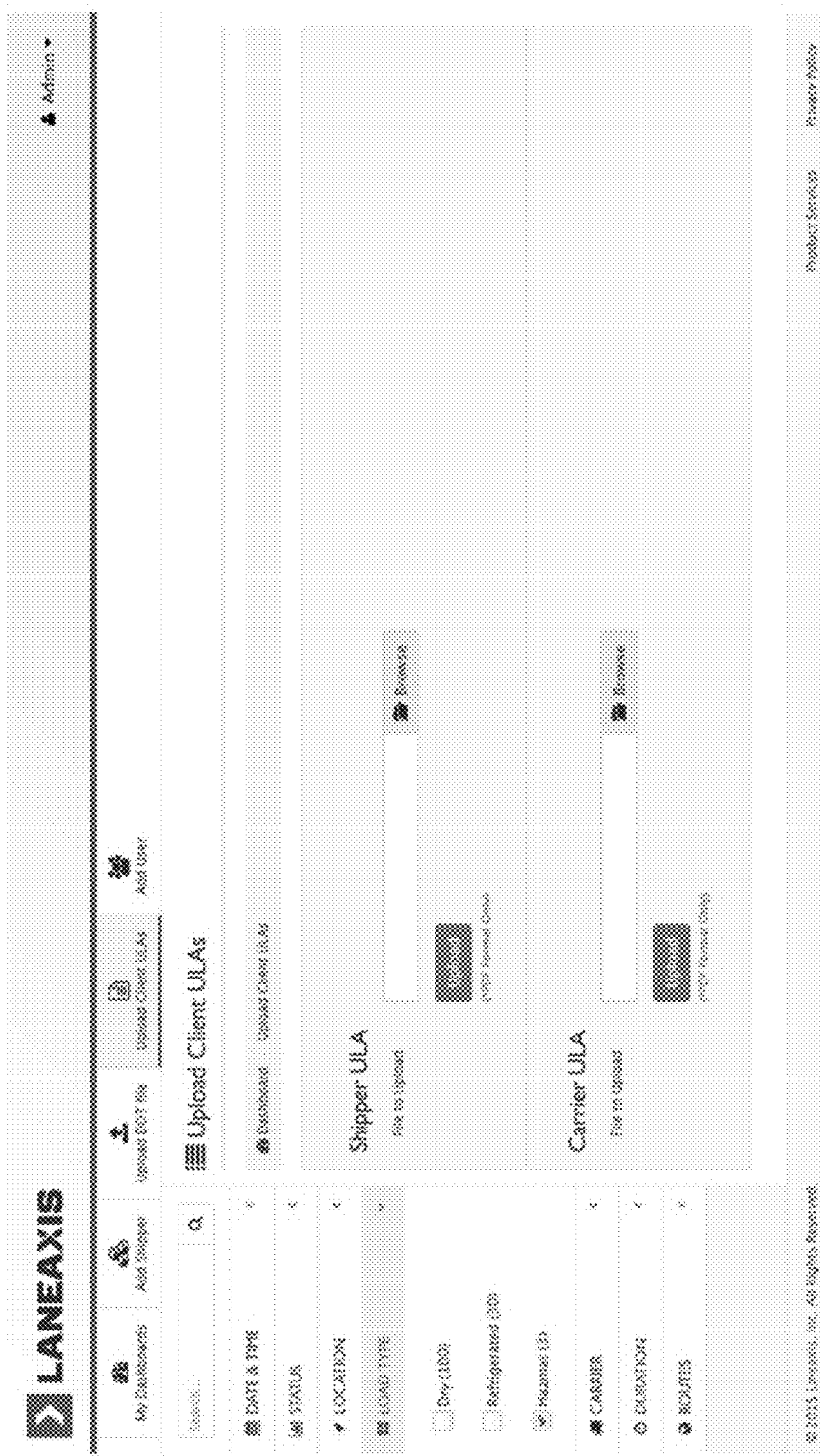
Figure 8E:
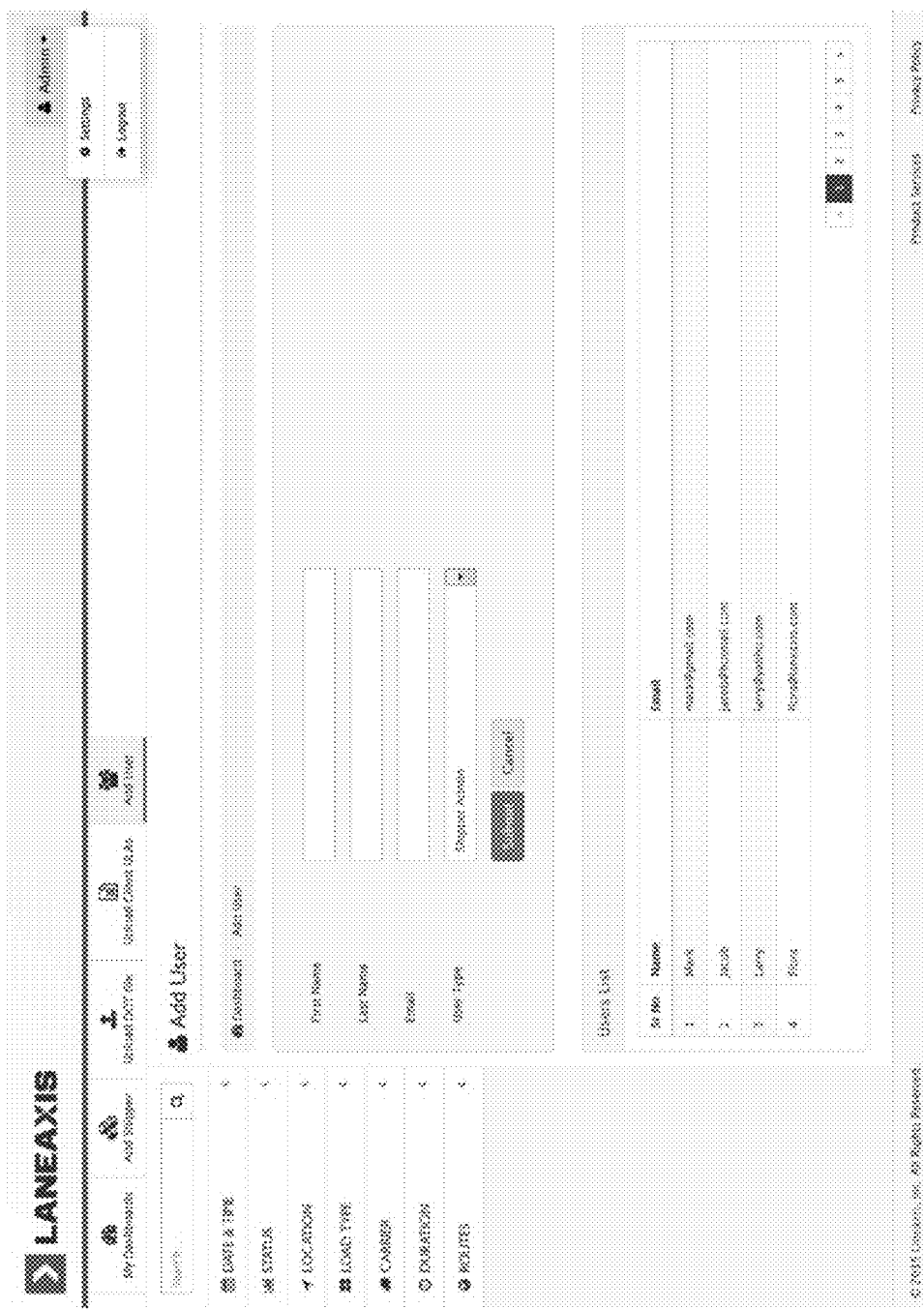
Figure 8F:
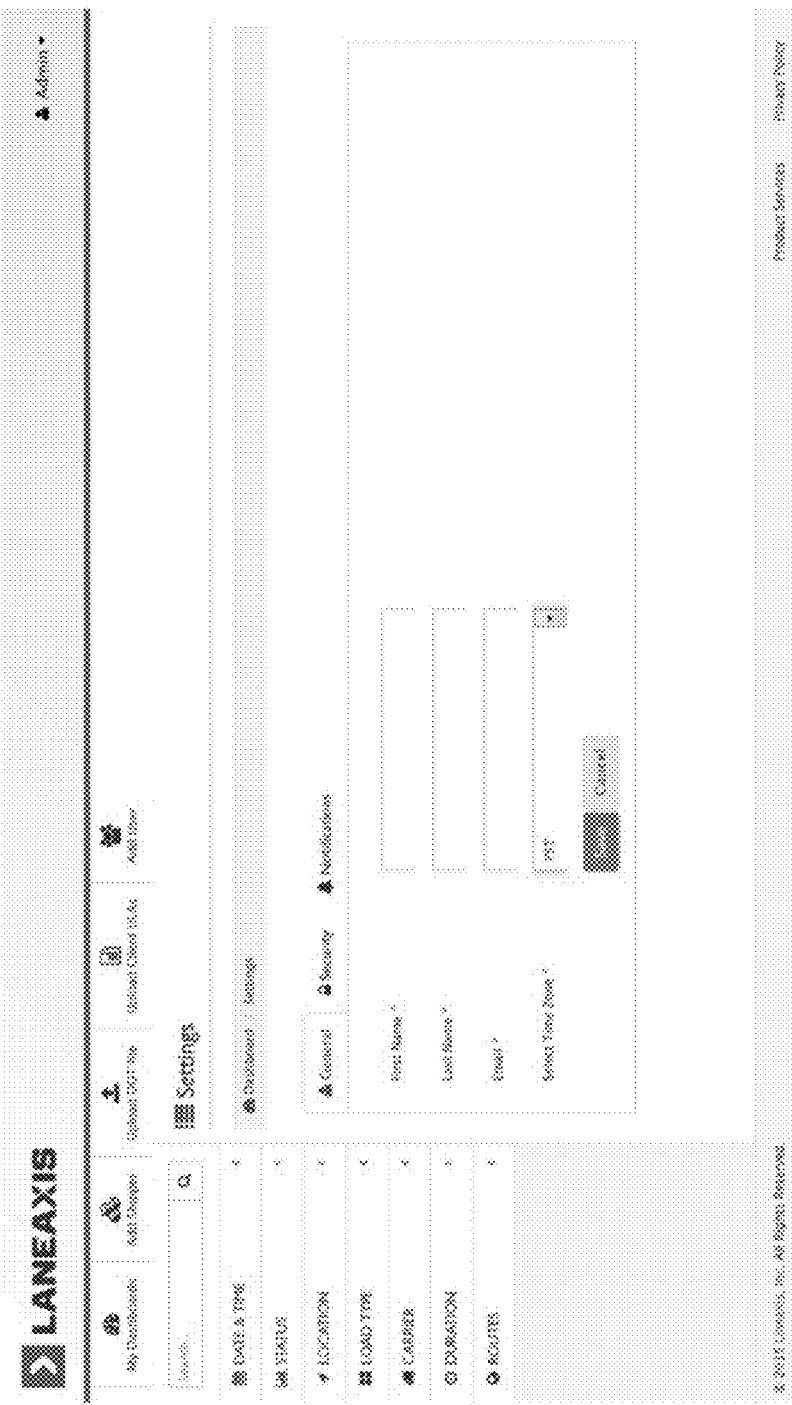
Figure 8G:
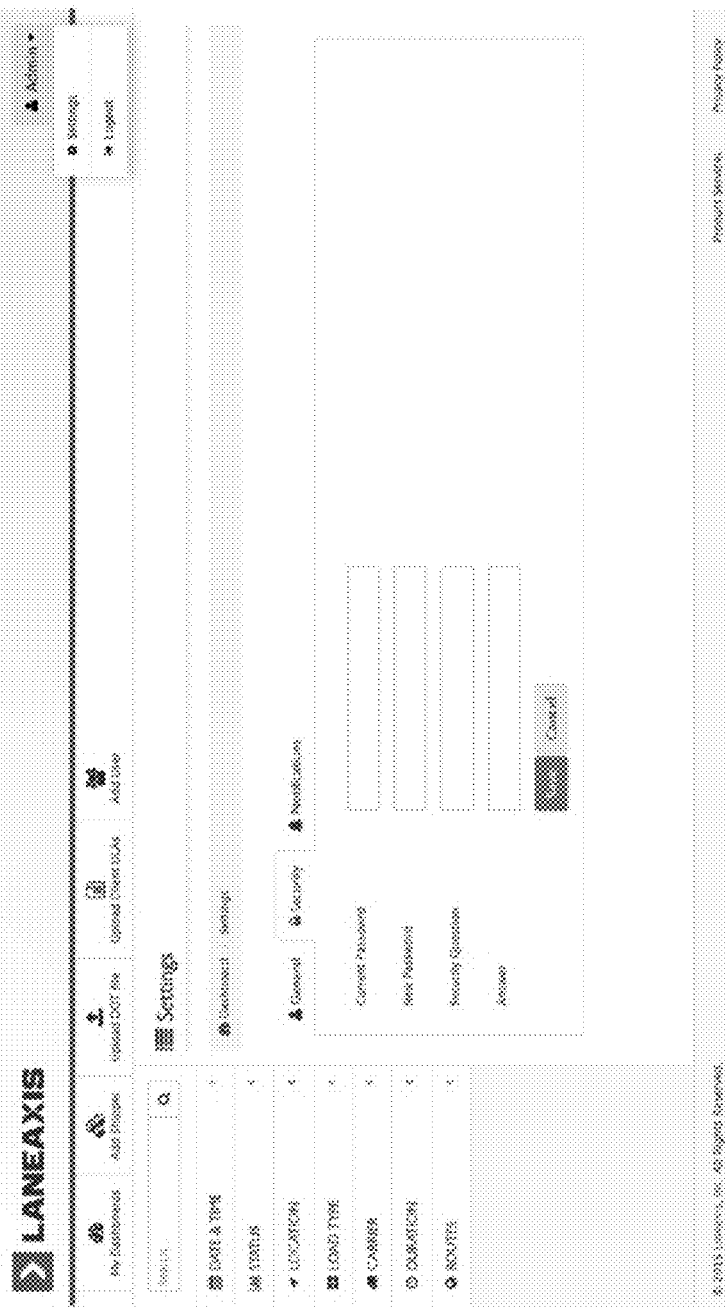
Figure 8H:
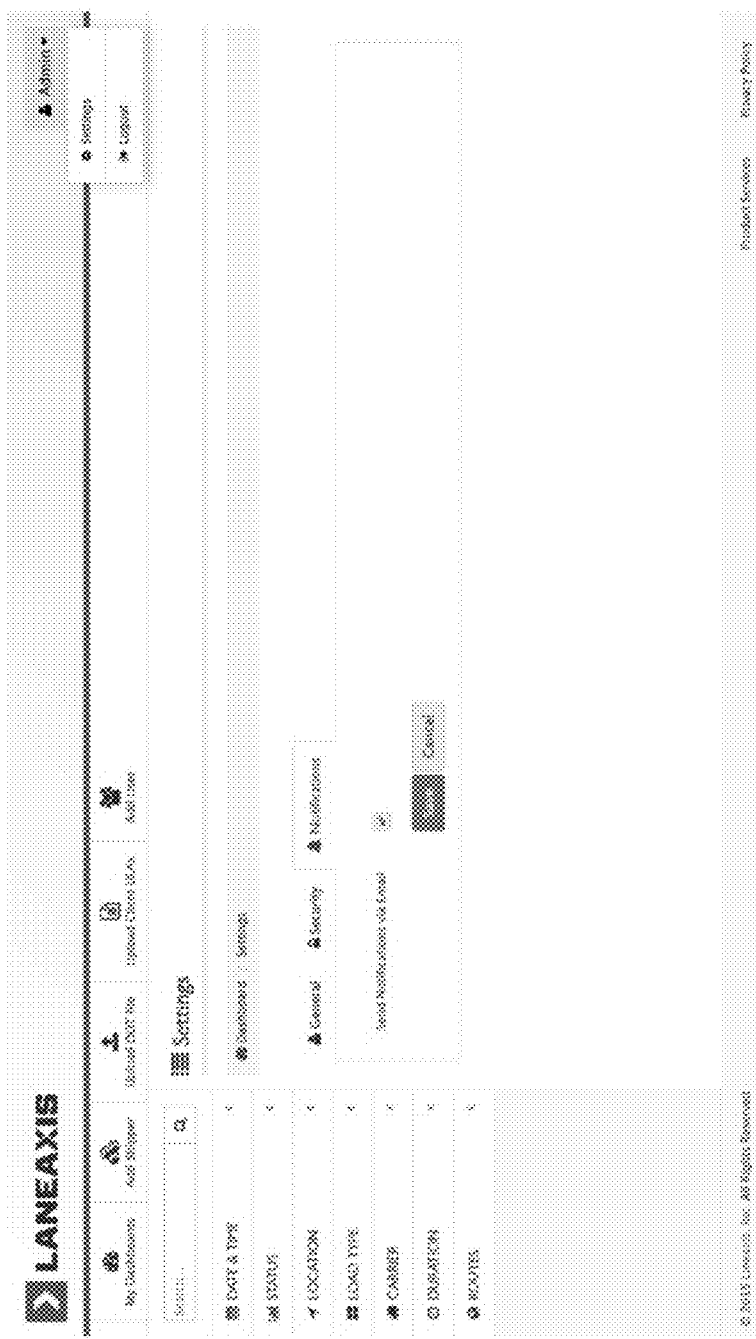

FIGS. 7A-7C show exemplary methods of interaction between a shipper and a carrier via an interaction optimizing platform. The method 700A, or scenario, shown in FIGS. 7A and 7B is for when a carrier accepts a shipment from a shipper. In this scenario, the interaction can start with the shipper uploading a contract, a manifest, and/or business rules, 710. The interaction optimization platform can match the shipment requirements indicated by the shipper to available carriers, 715. The result of this matching can be provided to the shipper via the shipper interface. The shipper can select a potential suitable carrier using the shipper interface, 720. The selected carrier can then receive information about the shipment 730 and can accept the shipment 735. The carrier can assign the shipment to a particular driver 735. The driver associates his or her mobile computing device (e.g., smart phone, tablet computer) with the shipment 740 and the mobile computing device provides location information and/or other status information to the interaction optimization platform 745. The interaction optimization platform can provide that information in a useful manner via a progress interface 745. Once the shipment reaches its destination, confirmation can be sent through the interaction optimization platform 750.

FIG. 7C shows a representative scenario 700B in which the carrier or driver has declined a shipment 736. A reason is sent for declining the shipment 736. This can enable the shipper to tailor his or her search for a carrier in the future. When the interaction optimization platform notifies the shipper of the carrier's decline of the shipment, other potential carriers can be presented to the shipper 737.

As mentioned above, the input from one or more shippers can include specifications for a shipment, a bid for use of a carrier's equipment, or both shipment specifications and a bid for use of a carrier's equipment. Specifications for a shipment can include a threshold or auto execute cost value, dates for the shipment, point of origin, destination, desired ratings score of the carrier, type of cargo, cargo handling needs, or any combination thereof. A bid for use of a carrier's equipment can include a proposed payment amount. As an alternative to the scenarios in FIGS. 7A-7C, shippers and/or carriers can search postings and tailor bids to those postings to become a highly favorable suitable carrier or shipper. FIGS. 8A-8H show views of the interaction optimizing platform that can be seen by a user, either a shipper or carrier, when creating a bid.

The interaction optimization platform can provide the shipper the option of automatically engaging a carrier when the carrier meets the shipper's criteria for a particular shipment, including the cost for fulfilling the shipment. Upon automatically engaging a carrier that meets the acceptable criteria, both the shipper and carrier can be notified via e-mail, text message, phone message, or any combination thereof. Additionally, each shipment posted by a shipper has time lines, including deadlines, of when the shipment needs to depart a point of origin, as well as when it needs to arrive. After being posted to the platform, a shipment posting can be identified, such as by color coding or categorizing, by the time until the shipment needs to depart its point of origin, such as in FIG. 8A. For example, if a posted shipment is within twenty-four hours of its departure time, the posting can be color coded yellow. Once the shipment is within a shorter time period, such as 4 or 2 hours from its departure time, the shipment posting can be color coded red. Expired shipment postings can be categorized as either expired-fulfilled or expired-unfulfilled and displayed only when a shipper or carrier searches for such shipment postings.

The input from one or more carriers can include equipment availability information, a bid for the cost of transporting a shipment of cargo, or both equipment availability information and a bid for the cost of transporting a shipment of cargo. The equipment availability information can include the type of equipment available, the dates and time of availability, the threshold cost of hiring, an auto execute hiring value, availability origin location, availability destination location, and any combination thereof. A bid for the cost of transporting a shipment of cargo can include the hourly driver cost, the mileage cost for the equipment, fuel costs, special route costs (e.g., tolls, bridge assessments, taxes, or the like), special handling costs upon loading or delivery, and any combination thereof.

As with the shipment postings, equipment availability postings can have an auto-execute setting which prompts the platform to accept a bid on behalf of the carrier once certain criteria are met. One of the criteria can be the price that the shipper is willing to pay to engage the carrier and his or her equipment.

It is feasible that a carrier can post his or her equipment as available while bidding to be the carrier for shipments with deadlines that coincide with the posted availability of the equipment. In such cases, should a bid to provide service be accepted by a shipper, the availability post can be removed by the carrier. Conversely, should the carrier accept a bid to hire equipment, the carrier should remove any conflicting bids to supply equipment to a shipper. Alternatively, the platform can remove conflicting posts on behalf of the carrier either concurrently with or after notification of the post's removal. A carrier or shipper can also control the types of notifications he or she receives (FIG. 8H), as well as updating contact information and other relevant information (FIGS. 8B-8G).

The platform can provide interfaces for tracking any shipment, for generating proof of delivery, for creating lists of preferred shippers or carriers, for generating cost estimates, for locating shipments with origins that coincide with the termination of one shipment, or any combination thereof.

The shipper and carrier interaction optimization platform can suggest matches for each posting, such that a shipper can see which carriers have posted or indicated availability that matches a shipment's specifications or such that a carrier can find out which shipments meet the availability of his or her equipment. Such proposed matches can facilitate agility in the shipper's schedule, such as when the shipper is suddenly inconvenienced due to weather or other traffic obstructions, or when there is an unexpected surge in orders that require fulfillment. Another benefit of such proposed matches can be that carriers can minimize the number of trips made by drivers with empty vehicles, that is to say without cargo or a shipment.

Tracking each shipment using the shipper and carrier interaction optimization platform can entail using positioning components and/or software on each driver's hand held device (e.g., mobile phone, smartphone, tablet or the like), on built-in positioning equipment on a carrier's vehicle, or on a positioning component on a dedicated computing device used by a driver during shipment delivery. Positioning components and/or software can use global positioning satellite systems (GPS systems), cell tower or other cell signal information, Wi-Fi signal information, or the like to indicate position and progress of a shipment.

The shipper and carrier interaction optimization platform can provide special alerts associated with the position of a carrier's driver with respect to a point of origin and a destination. At the beginning of a shipment, after both the shipper and the carrier have agreed to enter into a service relationship, the shipper can receive an alert indicating the distance of the carrier's appointed driver from the point of origin for the shipment he or she is contracted to transport. A threshold distance, or geo-fence, can be pre-determined by the shipper or by the shipper and carrier interaction optimization platform. This pre-determined, threshold distance can be selected to give the shipper an idea of the timeliness of the carrier's driver, but also to allow for preparation for the arrival of the driver. Additionally, or alternatively, the shipper and carrier interaction optimization platform can alert the shipper, the carrier, or both the shipper and carrier when a driver is within a pre-determined threshold distance from the shipment destination, breaching the geo-fence. The alert can be an e-mail, a voice message, a text message, an audio alert, a haptic alert, or any combination thereof.

The shipper and carrier interaction optimization platform can accept a shipping manifest when a post is accepted for a shipping opportunity or when a shipper's bid for hiring equipment is accepted by a carrier. Once the bid is accepted, the associated shipping manifest can be electronically delivered to the carrier automatically by the shipper and carrier interaction optimization platform. When the carrier assigns a shipment to a particular driver or drivers, the corresponding shipping manifest can be automatically sent to the driver's or drivers' position indicating computing device (e.g., hand held telephone or computing device, GPS, or wearable computing device). In such implementations, one or more geo-fences can be delineated within the shipper and carrier interaction optimization platform and the position of the shipment relative to the one or more geo-fences can be calculated with respect to the driver's or drivers' position indicating computing device. Further, or alternatively, in such implementations, a mobile application or a website can launch once the position indicating computing device breaches the corresponding geo-fence after the shipment is loaded onto the carrier's equipment. The one or more geo-fences can include a geo-fence about the point of origin, about the destination, and about points along a predetermined route from the point of origin to the destination. Using such geo-fences, the shipper and carrier interaction optimization platform can indicate to the shipper, the carrier, the driver, or any combination thereof, when the shipment has deviated and is "off route," such as by sending alerts, messages, and the like. When the driver and shipment breeches a geo-fence about the shipment's destination, then an eminent delivery alert can be sent by the shipper and carrier interaction optimization platform to the shipper, the carrier, the driver, or any combination thereof, indicating "real-time delivery." At this time, the shipper and carrier interaction optimization platform can prepare a proof of delivery interface that the driver can present to an authorized person at the destination or that the driver can fill out to prove delivery. Further, or alternatively, the actual delivery time (e.g., the time the shipment reaches the destination precisely or the time the shipment is off-loaded from the equipment) can be sent with the proof of delivery to the shipper and carrier interaction optimization platform.

As mentioned above, the shipper and carrier interaction optimization platform can provide both the shipper and the carrier with useful information. Once a bid has been accepted and a shipper and a carrier have come to an agreement with respect to a shipment, the shipper and carrier interaction optimization platform can e-mail the shipment manifest directly to the hand-held device of the carrier's driver or drivers. The shipper and carrier interaction optimization platform can provide alerts to both the shipper and carrier regarding location of the driver, location of the shipment, shipment exceptions (e.g., last minute changes in quantity or destination), and potential impediments to the shipment delivery, such as weather delays, traffic jams, and the like. The location of the shipment, by tracking the location of the driver's hand held device, wearable computing device, or GPS device, can be monitored in real time, with the location data updated each minute during transit. The shipper and carrier interaction optimization platform can detect the timeliness of the shipment, and if the shipment is projected to be delayed by more than a predetermined, threshold amount of time, then an alert can be sent to the shipper, the driver, the carrier, or any combination thereof.

The shipper and carrier interaction optimization platform can be a free to join system. Shippers and carriers that are part of the associated shipping community can view available equipment or shipping jobs free of charge, in some cases with the information regarding the posting party redacted. In some implementations, members of the associated shipping community can pay for each bid that is accepted in response to a post. Alternatively, or additionally, members of the associated shipping community can pay a fee for each month in which a bid is accepted in response to a post. For example, cost for each accepted bid can be a first amount, and the monthly cost can be a second amount that is about two times or more than the first amount (e.g., the first amount is $19.95 and the second amount is $39.95). In some implementations, costs can be borne by the party whose bid was accepted. In other implementations, only the carriers can pay fees to use the shipper and carrier interaction optimization platform. In other implementations, costs can be borne by both the shipper and carrier. However, in some such implementations, either the carrier or the shipper can pay more for using the shipper and carrier interaction optimization platform.

Aspects of the subject matter described herein can be embodied in systems, apparatus, methods, and/or articles depending on the desired configuration. Some implementations of the subject matter described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications, applications, components, or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Because of the high-level nature and complexity of the selections and methods described herein, including the multiple and varied combinations of different tasks, including the detection of the location of carrier's driver, and real-time coordination of the available shipments with available equipment, the calculations, computations and selections cannot be done in real time quickly or at all by a human. The processes described herein rely on the machines described herein.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for optimizing shipper and carrier interaction comprising:

creating, at a server, a plurality of carrier profiles based on carrier information provided into a plurality of carrier profile data fields displayed at respective ones of a plurality of carrier display devices, each of the plurality of carrier profiles comprising at least one identification number for a respective at least one driver mobile device and each of the plurality of carrier display devices in communication with the server over a network;

creating, at the server, a shipment request based on shipment information relating to a shipment to be fulfilled and comprising a set of rules and a document associated with the shipment, the shipment information provided at a shipper display device in communication with the server over the network;

automatically assigning, by the server, the shipment to a particular carrier associated with a particular driver mobile device, the automatic assignment based on the particular carrier conforming to the set of rules and the document;

associating, by the server the shipment with the particular driver mobile device associated with a driver, wherein the particular driver mobile device is configured to accept and/or generate driver mobile device location information for the particular driver mobile device and relay the driver mobile device location information to the server;

generating, by the server a plurality of graphical interfaces on a mobile application when the mobile application is running on one or more of the particular driver mobile device, the carrier display device of the particular carrier, and the shipper display device, the plurality of graphical interfaces comprising:
 a shipment information screen comprising information about the shipment;
 a declined load screen configured to receive user-input relating to the driver declining the association;
 an accepted load screen configured to receive user input specifying that the shipment has been picked up by the driver; and
 a progress screen comprising a graphical indication of the mobile device location information;

causing, by the server, a deviation alert to be generated and transmitted to one or more of the carrier display device of the particular carrier, the particular driver mobile device, and the shipper display device, the deviation alert based on deviation by the particular mobile device from an electronically defined geofence surrounding a point of origin, an electronically defined geofence surrounding points along a predetermined route, and an electronically defined geofence surrounding a destination;

automatically generating, by the server, a delivery verification screen on the mobile application, the delivery verification screen configured to receive user input specifying that the shipment has arrived at the destination;

transmitting, from the server to the mobile application, an arrival time corresponding to the particular driver mobile device breaching the electronically defined geofence surrounding the destination, the transmitting based at least on a tracking signal being transmitted by the particular driver mobile device from within the geofence;

automatically switching, by the server, the displayed progress screen to the delivery verification screen when the tracking signal from the particular driver mobile device is transmitted from within the geofence, the delivery verification screen comprising:
 a selection interface configured to transmit a confirmation or a lack of confirmation that the shipment has been delivered;
 a photo button which, in response to user input, activates a camera of the particular driver mobile device to take a digital image;
 a comments section configured to receive textual user input; and
 a submit button which, in response to user input, transmits the confirmation or lack of confirmation, the digital image, and the textual user input from the comments section, to the server.

2. The method of claim 1, the shipment information screen comprising:
 a first graphical indication of a shipment pickup time;
 a second graphical indication of a shipment delivery time;
 a third graphical indication of a shipment distance and a shipment duration;
 a fourth graphical indication of a shipment origin;
 a fifth graphical indication of a shipment destination;
 a details button which, in response to user input, displays a shipping manifest at the driver mobile device; and
 a plurality of buttons which, in response to user input, initiates the associating or declines the associating and displays a declined load comment screen.

3. The method of claim 1, the declined load screen comprising:
 a selection interface configured to display pre-defined reasons for declining a shipment and accept user input selecting at least one of the pre-defined reasons;
 a comments section configured to receive textual user input that can be stored and transmitted with the selected pre-defined reason; and
 a submission button which, in response to user input, transmits the selected predefined reason and the textual user input to the server.

4. The method of claim 1, the accepted load screen comprising:
 a selection interface configured to transmit a confirmation or a lack of confirmation that the shipment being picked up matches a manifest;
 a details button which, in response to user input, displays a graphical representation of a portion of the shipment information on the driver mobile device;
 a comments section configured to receive textual user input; and
 an accept button which, in response to user input, transmits the confirmation or lack of confirmation, and the textual user input from the comments section, to the server.

5. The method of claim 1, the progress screen comprising:
 a map displaying the position of the carrier location;
 a graphical representation of a status of the shipment, where the status is indicated as in transit after the shipment has been accepted through the accepted load screen and before the shipment has been verified as delivered at the delivery verification screen;
 a graphical indication of a remaining distance and a remaining time until the shipment will be delivered; and
 a problem reporting button, which in response to user input, initiates generation of a problem reporting screen.

6. The method of claim 5, the problem reporting screen comprising:
 a selection interface configured to display pre-defined problems and accept user input selecting at least one of the pre-defined problems;
 a comments section configured to receive textual user input that can be stored and transmitted with the selected pre-defined problem; and
 a submission button which, in response to user input, transmits the selected pre-defined problem, and the textual user input to the server.

7. A computer program product comprising a non-transient, machine-readable medium storing instructions which, when executed by at least one programmable processor, cause the at least one programmable processor to perform operations comprising:

creating, at a server, a plurality of carrier profiles based on carrier information provided into a plurality of carrier profile data fields displayed at respective ones of a plurality of carrier display devices, each of the plurality of carrier profiles comprising at least one identification number for a respective at least one driver mobile device and each of the plurality of carrier display devices in communication with the server over a network;

creating, at the server, a shipment request based on shipment information relating to a shipment to be fulfilled and comprising a set of rules and a document associated with the shipment, the shipment information provided at a shipper display device in communication with the server over the network;

automatically assigning, by the server, the shipment to a particular carrier associated with a particular driver mobile device, the automatic assignment based on the particular carrier conforming to the set of rules and the document;

associating, by the server the shipment with the particular driver mobile device associated with a driver, wherein the particular driver mobile device is configured to accept and/or generate driver mobile device location information for the particular driver mobile device and relay the driver mobile device location information to the server;

generating, by the server a plurality of graphical interfaces on a mobile application when the mobile application is running on one or more of the particular driver mobile device, the carrier display device of the particular carrier, and the shipper display device, the plurality of graphical interfaces comprising:
 a shipment information screen comprising information about the shipment;
 a declined load screen configured to receive user-input relating to the driver declining the association;
 an accepted load screen configured to receive user input specifying that the shipment has been picked up by the driver; and
 a progress screen comprising a graphical indication of the mobile device location information;

causing, by the server, a deviation alert to be generated and transmitted to one or more of the carrier display device of the particular carrier, the particular driver mobile device, and the shipper display device, the deviation alert based on deviation by the particular mobile device from an electronically defined geofence surrounding a point of origin, an electronically defined geofence surrounding points along a predetermined route, and an electronically defined geofence surrounding a destination;

automatically generating, by the server, a delivery verification screen on the mobile application, the delivery verification screen configured to receive user input specifying that the shipment has arrived at the destination;

transmitting, from the server to the mobile application, an arrival time corresponding to the particular driver mobile device breaching the electronically defined geofence surrounding the destination, the transmitting based at least on a tracking signal being transmitted by the particular driver mobile device from within the geofence;

automatically switching, by the server, the displayed progress screen to the delivery verification screen when the tracking signal from the particular driver mobile device is transmitted from within the geofence, the delivery verification screen comprising:
 a selection interface configured to transmit a confirmation or a lack of confirmation that the shipment has been delivered;
 a photo button which, in response to user input, activates a camera of the particular driver mobile device to take a digital image;
 a comments section configured to receive textual user input; and
 a submit button which, in response to user input, transmits the confirmation or lack of confirmation, the digital image, and the textual user input from the comments section, to the server.

8. The computer program product of claim 7, the shipment information screen comprising:
 a first graphical indication of a shipment pickup time;
 a second graphical indication of a shipment delivery time;
 a third graphical indication of a shipment distance and a shipment duration;
 a fourth graphical indication of a shipment origin;
 a fifth graphical indication of a shipment destination;
 a details button which, in response to user input, displays a shipping manifest at the driver mobile device; and
 a plurality of buttons which, in response to user input, initiates the associating or declines the associating and displays a declined load comment screen.

9. The computer program product of claim 7, the declined load screen comprising:
 a selection interface configured to display pre-defined reasons for declining a shipment and accept user input selecting at least one of the pre-defined reasons;
 a comments section configured to receive textual user input that can be stored and transmitted with the selected pre-defined reason; and
 a submission button which, in response to user input, transmits the selected predefined reason and the textual user input to the server.

10. The computer program product of claim 7, the accepted load screen comprising:
 a selection interface configured to transmit a confirmation or a lack of confirmation that the shipment being picked up matches a manifest;
 a details button which, in response to user input, displays a graphical representation of a portion of the shipment information on the driver mobile device;
 a comments section configured to receive textual user input; and
 an accept button which, in response to user input, transmits the confirmation or lack of confirmation, and the textual user input from the comments section, to the server.

11. The computer program product of claim 7, the progress screen comprising:
 a map displaying the position of the carrier location;
 a graphical representation of a status of the shipment, where the status is indicated as in transit after the shipment has been accepted through the accepted load screen and before the shipment has been verified as delivered at the delivery verification screen;
 a graphical indication of a remaining distance and a remaining time until the shipment will be delivered; and a problem reporting button, which in response to user input, initiates generation of a problem reporting screen.

12. The computer program product of claim 11, the problem reporting screen comprising:
   a selection interface configured to display pre-defined problems and accept user input selecting at least one of the pre-defined problems;
   a comments section configured to receive textual user input that can be stored and transmitted with the selected pre-defined problem; and
   a submission button which, in response to user input, transmits the selected pre-defined problem, and the textual user input to the server.

13. A system comprising:
   at least one programmable processor; and
   a non-transient machine-readable medium storing instructions which, when executed by the at least one programmable processor, cause the at least one programmable processor to perform operations comprising:
   creating, at a server, a plurality of carrier profiles based on carrier information provided into a plurality of carrier profile data fields displayed at respective ones of a plurality of carrier display devices, each of the plurality of carrier profiles comprising at least one identification number for a respective at least one driver mobile device and each of the plurality of carrier display devices in communication with the server over a network;
   creating, at the server, a shipment request based on shipment information relating to a shipment to be fulfilled and comprising a set of rules and a document associated with the shipment, the shipment information provided at a shipper display device in communication with the server over the network;
   automatically assigning, by the server, the shipment to a particular carrier associated with a particular driver mobile device, the automatic assignment based on the particular carrier conforming to the set of rules and the document;
   associating, by the server the shipment with the particular driver mobile device associated with a driver, wherein the particular driver mobile device is configured to accept and/or generate driver mobile device location information for the particular driver mobile device and relay the driver mobile device location information to the server;
   generating, by the server a plurality of graphical interfaces on a mobile application when the mobile application is running on one or more of the particular driver mobile device, the carrier display device of the particular carrier, and the shipper display device, the plurality of graphical interfaces comprising:
      a shipment information screen comprising information about the shipment;
      a declined load screen configured to receive user-input relating to the driver declining the association;
      an accepted load screen configured to receive user input specifying that the shipment has been picked up by the driver; and
      a progress screen comprising a graphical indication of the mobile device location information;
   causing, by the server, a deviation alert to be generated and transmitted to one or more of the carrier display device of the particular carrier, the particular driver mobile device, and the shipper display device, the deviation alert based on deviation by the particular mobile device from an electronically defined geofence surrounding a point of origin, an electronically defined geofence surrounding points along a predetermined route, and an electronically defined geofence surrounding a destination,
   automatically generating, by the server, a delivery verification screen on the mobile application, the delivery verification screen configured to receive user input specifying that the shipment has arrived at the destination;
   transmitting, from the server to the mobile application, an arrival time corresponding to the particular driver mobile device breaching the electronically defined geofence surrounding the destination, the transmitting based at least on a tracking signal being transmitted by the particular driver mobile device from within the geofence;
   automatically switching, by the server, the displayed progress screen to the delivery verification screen when the tracking signal from the particular driver mobile device is transmitted from within the geofence, the delivery verification screen comprising:
      a selection interface configured to transmit a confirmation or a lack of confirmation that the shipment has been delivered;
      a photo button which, in response to user input, activates a camera of the particular driver mobile device to take a digital image;
      a comments section configured to receive textual user input; and
      a submit button which, in response to user input, transmits the confirmation or lack of confirmation, the digital image, and the textual user input from the comments section, to the server.

14. The system of claim 13, the shipment information screen comprising:
   a first graphical indication of a shipment pickup time;
   a second graphical indication of a shipment delivery time;
   a third graphical indication of a shipment distance and a shipment duration;
   a fourth graphical indication of a shipment origin;
   a fifth graphical indication of a shipment destination;
   a details button which, in response to user input, displays a shipping manifest at the driver mobile device; and
   a plurality of buttons which, in response to user input, initiates the associating or declines the associating and displays a declined load comment screen.

15. The system of claim 13, the declined load screen comprising:
   a selection interface configured to display pre-defined reasons for declining a shipment and accept user input selecting at least one of the pre-defined reasons;
   a comments section configured to receive textual user input that can be stored and transmitted with the selected pre-defined reason; and
   a submission button which, in response to user input, transmits the selected predefined reason and the textual user input to the server.

16. The system of claim 13, the accepted load screen comprising:
   a selection interface configured to transmit a confirmation or a lack of confirmation that the shipment being picked up matches a manifest;
   a details button which, in response to user input, displays a graphical representation of a portion of the shipment information on the driver mobile device;

a comments section configured to receive textual user input; and an accept button which, in response to user input, transmits the confirmation or lack of confirmation, and the textual user input from the comments section, to the server.

17. The system of claim 13, the progress screen comprising:

a map displaying the position of the carrier location;

a graphical representation of a status of the shipment, where the status is indicated as in transit after the shipment has been accepted through the accepted load screen and before the shipment has been verified as delivered at the delivery verification screen;

a graphical indication of a remaining distance and a remaining time until the shipment will be delivered; and a problem reporting button, which in response to user input, initiates generation of a problem reporting screen.

18. The system of claim 17, the problem reporting screen comprising:

a selection interface configured to display pre-defined problems and accept user input selecting at least one of the pre-defined problems;

a comments section configured to receive textual user input that can be stored and transmitted with the selected pre-defined problem; and a submission button which, in response to user input, transmits the selected pre-defined problem, and the textual user input to the server.

\* \* \* \* \*